United States Patent
Chen et al.

(10) Patent No.: US 10,565,227 B1
(45) Date of Patent: Feb. 18, 2020

(54) LEADERSHIP LEASE PROTOCOL FOR DATA REPLICATION GROUPS

(71) Applicant: Amazon Technologies, Inc., Seattle, WA (US)

(72) Inventors: Tao Chen, Sammamish, WA (US); Marc John Brooker, Seattle, WA (US); Divya Ashok Kumar Jain, Bellevue, WA (US); Norbert Paul Kusters, Redmond, WA (US); Fan Ping, Kenmore, WA (US); Lakshmi N. Pallikila, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 15/253,677

(22) Filed: Aug. 31, 2016

(51) Int. Cl.
*G06F 17/30* (2006.01)
*G06F 16/27* (2019.01)

(52) U.S. Cl.
CPC .................................. *G06F 16/27* (2019.01)

(58) Field of Classification Search
None
See application file for complete search history.

(56) References Cited

U.S. PATENT DOCUMENTS

| | | | |
|---|---|---|---|
| 5,909,540 A | 6/1999 | Carter et al. | |
| 6,374,241 B1 | 4/2002 | Lamburt et al. | |
| 6,662,219 B1 | 12/2003 | Nishanov et al. | |
| 7,039,773 B2 | 5/2006 | Hu et al. | |
| 7,711,820 B2 * | 5/2010 | Sharma | G06F 11/2028 709/209 |
| 7,937,482 B1 * | 5/2011 | Vermeulen | G06F 11/1425 709/229 |
| 8,301,600 B1 | 10/2012 | Helmick et al. | |
| 8,572,031 B2 * | 10/2013 | Merriman | G06F 17/30578 707/613 |
| 8,732,517 B1 | 5/2014 | Stefani et al. | |
| 8,843,441 B1 | 9/2014 | Rath et al. | |
| 8,856,593 B2 * | 10/2014 | Eckhardt | G06F 11/2028 709/217 |
| 8,868,514 B2 | 10/2014 | Lomet et al. | |
| 8,965,849 B1 | 2/2015 | Goo | |
| 9,047,246 B1 * | 6/2015 | Rahut | G06F 11/1425 |
| 9,047,331 B2 | 6/2015 | Rao et al. | |

(Continued)

OTHER PUBLICATIONS

Lamport, "Paxos Made Simple," Microsoft Research, <http://research.microsoft.com/en-us/um/people/lamport/pubs/paxos-simple.pdf> [retrieved Aug. 22, 2016], 2001, 14 pages.

(Continued)

*Primary Examiner* — Debbie M Le
(74) *Attorney, Agent, or Firm* — Davis Wright Tremaine LLP

(57) ABSTRACT

Data replication groups may be used to store data in a distributed computing environment. A data replication group may include a set of nodes executing a consensus protocol to maintain data durably. In order to increase efficiency and performance of the data replication, a particular node of the data replication group may be assigned the role of master node. The role of master node may be lease in accordance with a consensus protocol. If the lease is not renewed within an interval of time election/selection of a new master node may be commenced.

20 Claims, 13 Drawing Sheets

(56) References Cited

U.S. PATENT DOCUMENTS

| | | | |
|---|---|---|---|
| 9,223,843 B1 | 12/2015 | Madhavarapu et al. | |
| 9,230,000 B1 | 1/2016 | Hsieh et al. | |
| 9,317,576 B2* | 4/2016 | Merriman | G06F 11/1458 |
| 9,489,434 B1 | 11/2016 | Rath | |
| 9,552,242 B1 | 1/2017 | Leshinsky et al. | |
| 9,569,513 B1* | 2/2017 | Vig | G06F 17/30575 |
| 9,639,589 B1 | 5/2017 | Theimer et al. | |
| 9,805,108 B2* | 10/2017 | Merriman | G06F 17/30578 |
| 10,171,629 B2* | 1/2019 | Bute | H04L 67/10 |
| 2002/0161889 A1 | 10/2002 | Gamache et al. | |
| 2004/0263152 A1 | 12/2004 | Ahrikencheikh | |
| 2005/0005200 A1 | 1/2005 | Matena et al. | |
| 2006/0020634 A1 | 1/2006 | Huras et al. | |
| 2006/0218204 A1 | 9/2006 | Ofer et al. | |
| 2007/0156842 A1 | 7/2007 | Vermeulen et al. | |
| 2007/0299955 A1 | 12/2007 | Hoffman et al. | |
| 2009/0049240 A1 | 2/2009 | Oe et al. | |
| 2010/0274768 A1 | 10/2010 | Wang et al. | |
| 2011/0307886 A1 | 12/2011 | Thanga et al. | |
| 2012/0011398 A1* | 1/2012 | Eckhardt | G06F 11/2028 714/15 |
| 2012/0117229 A1 | 5/2012 | Van Biljon et al. | |
| 2012/0197868 A1 | 8/2012 | Fauser et al. | |
| 2013/0110774 A1 | 5/2013 | Shah et al. | |
| 2013/0290249 A1 | 10/2013 | Merriman et al. | |
| 2014/0032506 A1 | 1/2014 | Hoey et al. | |
| 2014/0136896 A1 | 5/2014 | Tak et al. | |
| 2014/0172944 A1 | 6/2014 | Newton et al. | |
| 2014/0337393 A1 | 11/2014 | Burchall et al. | |
| 2015/0169417 A1 | 6/2015 | Brandwine et al. | |
| 2015/0186229 A1 | 7/2015 | Bortnikov et al. | |
| 2015/0347548 A1 | 12/2015 | Mortensen et al. | |
| 2015/0372389 A1 | 12/2015 | Chen et al. | |
| 2016/0147859 A1 | 5/2016 | Lee et al. | |
| 2017/0004317 A1 | 1/2017 | Bumbulis | |
| 2017/0270176 A1* | 9/2017 | Horowitz | G06F 17/30371 |
| 2017/0366451 A1* | 12/2017 | Schreter | H04L 45/28 |
| 2017/0366619 A1 | 12/2017 | Schreter | |
| 2017/0371567 A1 | 12/2017 | Piduri | |

OTHER PUBLICATIONS

MacCormick et al., "Niobe: A Practical Replication Protocol," Microsoft Research, <https://www.microsoft.com/en-us/research/wp-content/uploads/2007/08/tr-2007-112.pdf> [retrieved Aug. 22, 2016], 2007, 42 pages.

Trencseni et al., "PaxosLease: Diskless Paxos for Leases," Cornell University Library, <http://arxiv.org/pdf/1209.4187.pdf> [retrieved Aug. 22, 2016], 2012, 9 pages.

Abadi, "Consistency Tradeoffs in Modern Distributed Database System Design," Computer 45(2):37-42, Feb. 2012.

Bernstein, "Rethinking Eventual Consistency," Proceedings of the 2013 ACM SIGMOD International Conference on Management of Data, Jun. 22-27, 2013, 5 pages.

Chandy et al., "Distributed Snapshots: Determining Global States of Distributed Systems," ACM Transactions on Computer Systems 3(1):63-75, Feb. 1985.

Decandia et al., "Dynamo: Amazon's Highly Available Key-value Store," ACM SIGOPS Operating Systems Review 41(6):205-220, Oct. 14, 2007.

Dwork et al., "Consensus in the presence of partial synchrony," Journal of the Association for Computer Machinery 35(2):288-323, Apr. 1, 1988.

Gilbert et al., "Brewer's Conjecture and the Feasibility of Consistent, Available, Partition-Tolerant Web Services," ACM SIGACT News 33(2):51-59, Jun. 1, 2002.

Gray et al., "Leases: An Efficient Fault-Tolerant Mechanism for Distributed File Cache Consistency," ACM SIGOPS Operating Systems Review 23(5):202-210, Dec. 3-6, 1989.

Lamport et al., "Cheap Paxos," International Conference on InDependable Systems and Networks, Jun. 28, 2004, 9 pages.

Letia et al., "CRDTs: Consistency without concurrency control," Rapport de recherche 6956, Jun. 2009, 13 pages.

Peleg et al., "The Availability of Quorum Systems," Information and Computation 123(2):210-223, Dec. 1, 1995.

Wikipedia, "Paxos (computer science)," Wikipedia, the Free Encyclopedia, page last edited Jun. 5, 2017 [retrieved Jun. 6, 2017], https://en.wikipedia.org/w/index.php?title=Paxos_(computer_science) &oldid=783901344, 19 pages.

"Ford-Fulkerson Algorithm," Wikipedia, The Free Encyclopedia, Aug. 9, 2016, https://en.wikipedia.org/wiki/Ford%E2%80% 93Fulkerson_algorithm [Retrieved Aug. 29, 2016], 5 pages.

"Maximum flow problem," Wikipedia, The Free Encyclopedia, Aug. 22, 2016, https://en.wikipedia.org/wiki/Maximum_flow_problem [Retrieved Aug. 29, 2016], 11 pages.

Chen et al., "Replication Group Pools for Fast Provisioning," U.S. Appl. No. 14/954,928, filed Nov. 30, 2015.

Dhoolam et al., "Node Placement for Replication Groups," U.S. Appl. No. 15/264,479, filed Sep. 13, 2016.

\* cited by examiner

LEADERSHIP LEASE PROTOCOL FOR DATA REPLICATION GROUPS

BACKGROUND

Organizations invest in technologies that provide customers with access to computing resources. Such services provide access to computing and/or storage resources (e.g., storage devices providing either a block-level device interface or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented as a storage service may be made accessible, for example, from one or more physical or virtual machines implemented by another service.

Computer systems that provide services to customers may employ various techniques to protect the computer systems from a number of service requests that could potentially overload the computer systems. Furthermore, these computer systems may also employ various techniques to preserve customer data and customer experience during periods when the computer systems are overloaded or even experiencing failures. In general, a computer system is considered to be in an "overloaded" state if it is not able to provide the expected quality of service for at least some portion of customer requests it receives. Common solutions applied by overloaded computer systems include denying service to customers. In addition to this "overloaded" scenario, computer systems may also experience failure, including critical failure, power failure, or network failure.

To protect customer data against failures, customer data is often replicated across different computer systems. However, creating consistent replicas of customer data across a plurality of computer systems requires additional resources and requires consensus on customer data across the plurality of computer systems. Additionally, there is increased cost and time required to provision computer systems to maintain replicas of customer data. While such systems may maintain the integrity of customer data and mitigate the risk of loss, there may be a reduction in customer experience and delay in customers obtaining their data.

BRIEF DESCRIPTION OF THE DRAWINGS

Various techniques will be described with reference to the drawings, in which.

DETAILED DESCRIPTION

Figure 1:
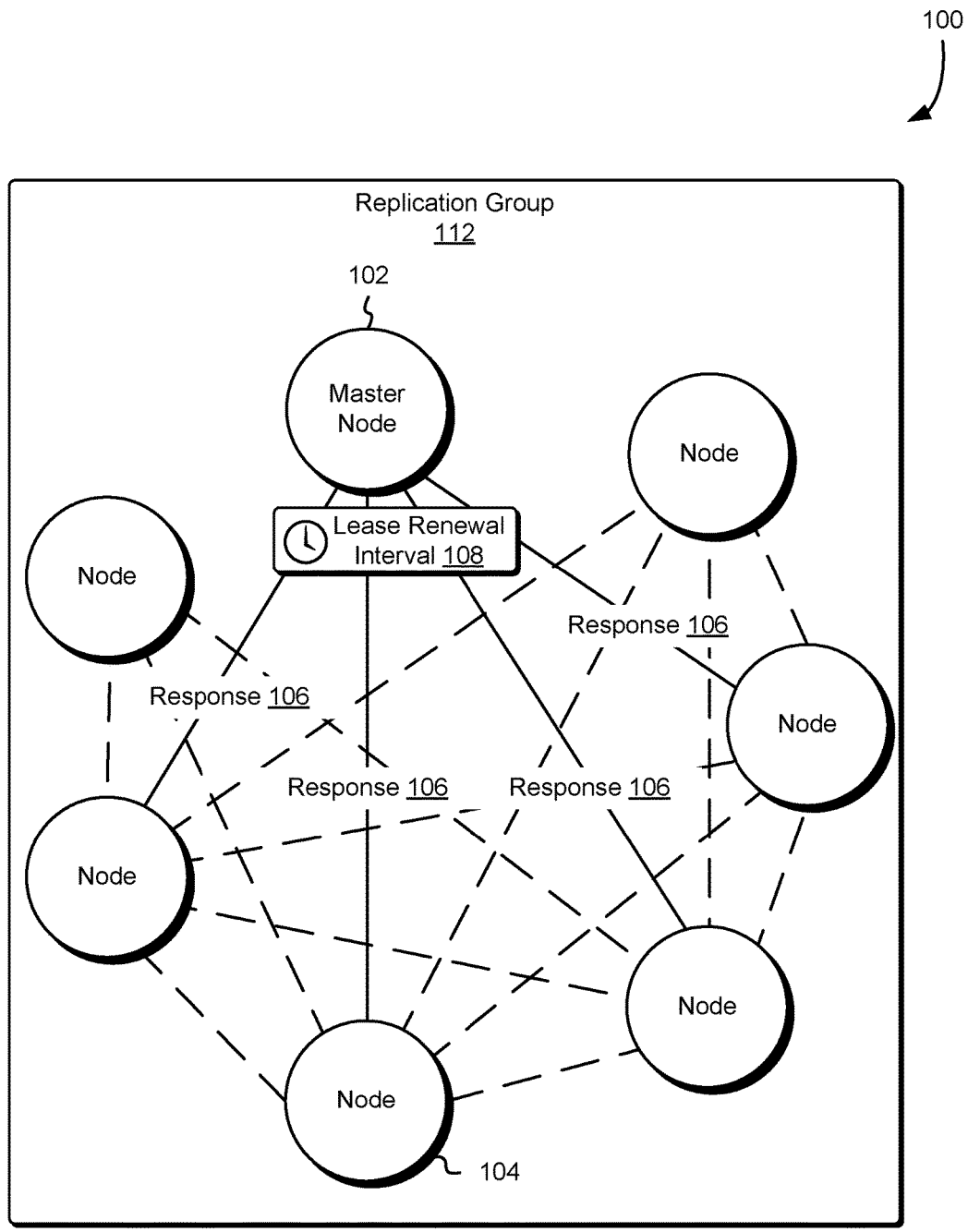
FIG. 1 illustrates an environment in which a set of nodes of a data replication group may be configured to execute an aspect of a lease protocol in accordance with at least one embodiment.

In various examples described below, a lease protocol is used to ensure a graceful failover period between elections of master nodes in a data replication group. In distributed computing systems, data replication reduces the risk of failure and mitigates possible data loss in the case of system failure. In one example, a data replication group maintains metadata associated with a master-slave volume pair. In addition, due to the distrusted nature of the computing systems it may be advantageous to reduce the amount of chatter (e.g., the exchange of messages between the computing systems) required to replicate data. For example, the data replication group may exchange a number of messages in order to maintain the consistency and integrity of the data replicated across the nodes of the data replication group. This traffic may be in addition to other traffic traversing various networks in the distributed computing environment (e.g., customer traffic) and may consume valuable computing resources within the distributed computing environment. Therefore, it is advantageous to reduce the amount of traffic generated by the nodes of the data replication group.

The data replication group may consist of some number of nodes executed by one or more host computer systems, where the nodes implement a consensus protocol, such as Paxos, to enable consistent data replication between the nodes. Other examples of consensus protocols include lockstep protocols, proof of work protocols, blockchain protocols, distributed lock managers, and hashgraph consensus protocols. In general, implementing the consensus protocol by the data replication groups involves the nodes' election of a master node. In various protocols, the master node may also be referred to as a leader, proposer, distinguished leader, distinguished proposer, or other such delineation indicating the role and/or responsibility of the node (e.g., the node responsible for progressing the algorithm). In some examples, the master node is the only node that may generate proposals that may be accepted by the nodes of the data replication group and progress the algorithm. As described above, the data replication group may be associated with a particular computer system or storage system and may maintain the current state of that system. Progressing the algorithm includes receiving and recording updates to the current state of the system supported by the data replication group.

To provision data replication groups in this manner, the master node exchanges messages with the other nodes of the data replication group to check the status of the node and maintain leadership. The messages are referred to has heartbeat messages and ensure that a quorum of the nodes of the data replication group are available to progress the algorithm. In general, the heartbeat messages are subject to that same strong consistency and persistence requirements as other messages of the consensus protocol (e.g., a request to store data). However as described above, to maintain the strong consistency and persistence requirements for the heartbeat messages requires the exchange of multiple messages and may cause network congestion and degradation of service. For example, some implementations of the Paxos protocol require five rounds to establish strong consistency and persistence. If there are seven nodes in a data replication group, 35 messages are required to achieve the desired result of the heartbeat message. In addition a heartbeat message may be required periodically or aperiodically (e.g., every 10 seconds) to progress the algorithm.

To reduce the amount of network traffic and message exchange generated by the data replication groups, a lease protocol is used. The lease protocol utilizes three time intervals to ensure progression of the algorithm and graceful failover in the event of a restart or error. The first interval is a heartbeat interval which is an interval of time during which the master node's lease is valid. The master node, in order to maintain the role of master node, must renew the lease before the expiration of the heartbeat interval. The lease may be renewed by receiving a successful response to a heartbeat message described in greater detail below. The second interval is a wait interval which is an interval of time during which the master node may still renew the lease, but upon expiration of the interval the master node is no longer able to transmit heartbeat messages. This may ensure receipt of response to heartbeat messages that are delayed and prevent the data replication group from containing two or more master nodes. Finally, a safety interval is included which is an interval of time during which nodes are prevented from starting elections for a new master node. After expiration of the safety interval, nodes may commence election operations. In some embodiments, the heartbeat interval may be less than the wait interval which is less than or equal to the safety interval. During the heartbeat interval, if the master node receives response to the heartbeat message form a quorum of the nodes of the data replication group, the lease is considered renewed and the heartbeat message a success.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a data replication group 112 may implement a consensus protocol between one or more nodes 104 and a master node 102, where the consensus protocol include a lease protocol for the role of master node in accordance with at least one embodiment. In various embodiments, only one node of the data replication group 112 is the master node 102 for any particular lease interval. Each node 104, including the master node 102, may be software or other executable code maintained in the memory of a physical host or other server computer system and executed by the physical host or other server computer system in order to provide the functionality described herein. Furthermore, the nodes 104 and master node 102 may be executed by one or more distinct physical hosts or other server computer systems. For example, two nodes of the data replication group 112 may be executed by a first physical host and the remaining nodes, including the master node 102, of the data replication group 112 may be executed by a second physical host. The physical hosts may include a variety of computing resources such as the server computer systems described below in connection with FIG. 10.

The nodes 104 and master node 102 of the data replication group 112 may be connected (illustrated as a solid line or dashed line between the nodes in FIG. 1) through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 104 and master node 102 may be distributed across physical hosts and networks such that failure of one or more networks or physical hosts does not cause all of the nodes 104 of the data replication group 112 to fail.

Although six nodes and one master node 102 are illustrated in FIG. 1, any number of nodes 104 and master nodes 102 may be included in the data replication group 112 and distributed across a plurality of distributed computer systems in accordance with the present disclosure. However, in some embodiments, only a single master node is included in the data replication group 112. This restriction may be required by the consensus protocol implemented by the data replication group 112 or may be a restriction enforced in order to increase efficiency and/or optimize execution of the data replication group 112. The master node 102 may be selected and/or determined from the set of nodes 104 in the data replication group 112 based at least in part on a node fitness score, random election, or other mechanisms for node election. For example, the data replication group 112 may be initialized with seven nodes 104 and the master node 102 may be selected from the set of seven nodes based at least in part on a particular election algorithm.

As illustrated in FIG. 1, the master node 102 may receive a number of responses 106 within a lease renewal interval 108. The lease renewal interval may be determined based at least in part on a lease protocol as described above. In various embodiments, the lease protocol requires the master node 102 to renew its lease of the master node role in order to maintain the role of master node 102. In order to renew the lease the master node 102 must receive a certain number of responses 106 from the nodes 104. The responses 106 may be responses to heartbeat messages described in greater detail below. If the master node receives the required number of responses 106, as defined by the lease protocol, within the lease renewal interval 108, the master node 102 may retain the master node role. However, if the master node 102 does not receive the required number of responses within the lease renewal interval 108, the master node 102 fails to retain the master node role and election/selection of a new master node may commence.

In yet other embodiments, the lease protocol includes two additional intervals: a wait interval and a safety interval. During the wait interval, the master node 102 may still receive responses 106 and renew the lease of the master node role but may not transmit addition requests to renew the master node role (e.g., heartbeat messages). After expiration of the wait interval, the lease of the master node role by the master node 102 is expired and election/selection of a new master node may commence. However, the lease protocol may prevent the election/selection of a new master node until expiration of the safety interval. After the expiration of the safety interval the nodes 104 may attempt to elect/select a new master node. The lease renewal interval 108 may be less than the wait interval which may be less than or equal to the safety interval. The lease protocol may include various states indicating whether a particular node is currently the master node, whether another node is currently the master node, whether the master node lease has expired, and other state information sufficient to determine the current state of the lease protocol between the nodes 104 as described in greater detail below in connection with FIG. 7.

In a specific example, the lease renewal interval 108 is three seconds, the wait interval is 10 seconds, and the safety interval is 16 seconds. This enables the master node 102 to attempt renewal of the lease several times before the expiration of the wait interval and also reduces the likelihood of election/selection of multiple master nodes. For example, the safety interval provides an interval of time during which each node may determine if the other nodes of the data replication group 112 have detected a failure of the master node 102 to renew the lease within the lease renewal interval 108. As described in greater detail below, the safety interval enables the nodes 104 to begin the election/selection process for a new master node. The various intervals (e.g., lease renewal interval 108, the wait interval, and the safety interval) may be periodic or aperiodic and may be measured concurrently, sequentially, or a combination. In addition, the nodes 104 and the master node 102 may maintain metadata and state information associated with the current state of the lease protocol. For example, the nodes 104 and the master node 102 may maintain a lease identification number and a current ballot number described in greater detail below. The lease identification number may be a unique number (relative to the data replication group 112) indicating the current lease. The ballot number may be a unique number (relative to the current lease identification number) that identifies a particular message from the master node 102.

The data replication group 112 may further include software or other executable code that, when executed by one or more processors, causes the computer systems executing the code to manage the operation of the data replication group 112, nodes 104, and/or master node 102. Managing the operation of the data replication group 112 may include creating new nodes, replacing failed nodes 104, providing discovery of nodes 104, backing up data maintained by the nodes 104, determining roles of the consensus protocol to be performed by the nodes 104, selecting a master node 102, and other such operations as required to ensure the functioning of the data replication group 112. In various embodiments, the master node 102 executes the distinguished leader or distinguished proposer role, as described above, of the Paxos consensus protocol. Furthermore, the master node 102 may ensure progress towards eventually consistent data storage and reads from the various nodes of the data replication groups 112. The data replication group 112, illustrated in FIG. 1, may be used in connection with various embodiments described herein. For example, the data replication group 112 may be a member of a pool of data replication groups described below in connection with FIG. 8. Additionally, the data replication group 112 may be initialized with a certain number of nodes 104 and may increase the number of nodes 104 over an interval of time until a desired number of nodes is reached.

Figure 2:
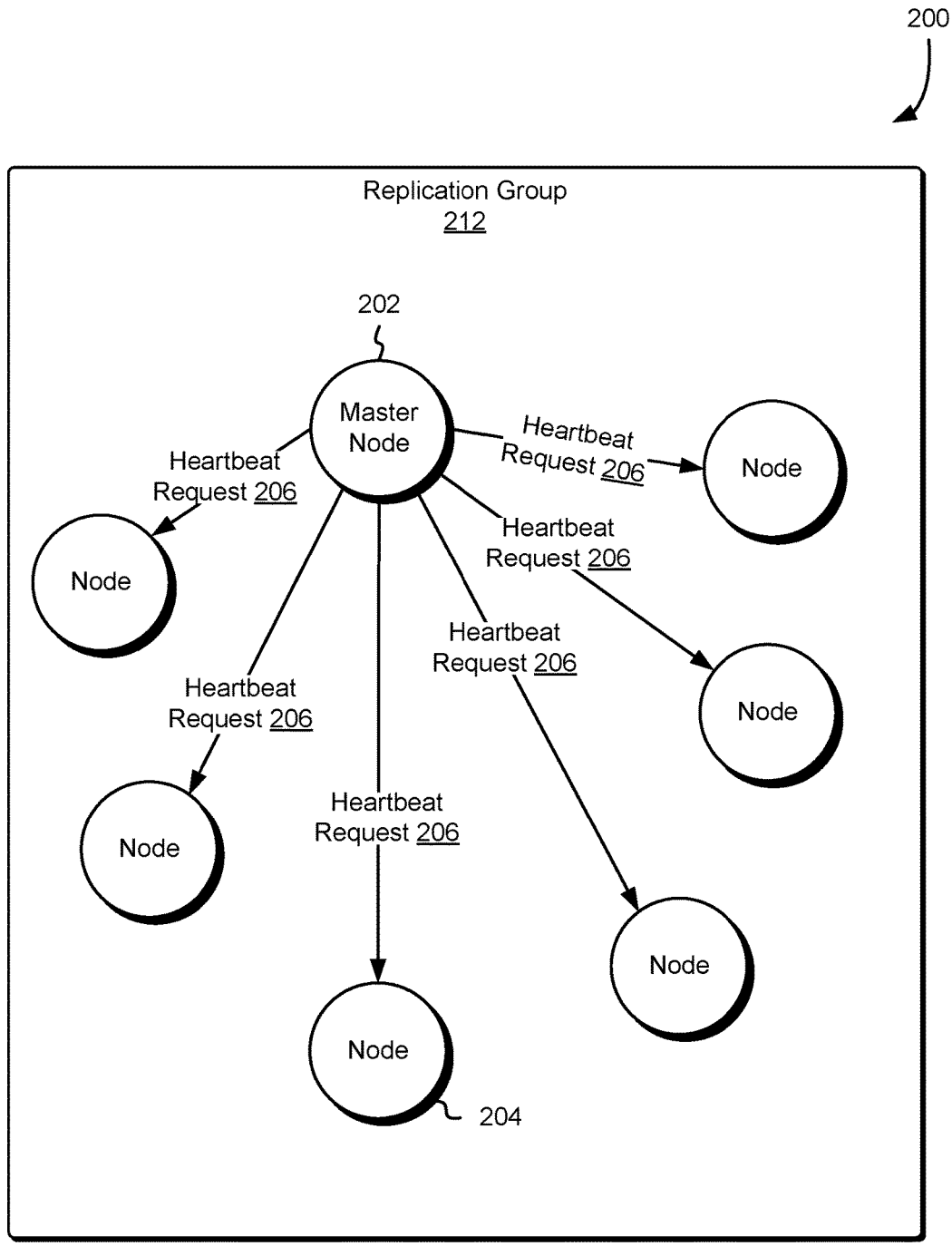
FIG. 2 illustrates an environment in which a set of nodes of a data replication group may be configured to execute an aspect of a lease protocol in accordance with at least one embodiment.

FIG. 2 illustrates an environment 200 in which a data replication group 212 may implement a consensus protocol between one or more nodes 204 and a master node 202, where the consensus protocol includes a lease protocol associated with the role of master node in accordance with at least one embodiment. In various embodiments, only one node of the data replication group 212 is the master node 202 for any particular lease interval. Each node 204, including the master node 202, may be software or other executable code maintained in the memory of a physical host or other server computer system and executed by the physical host or other server computer system in order to provide the functionality described herein. Furthermore, the nodes 204 and master node 202 may be executed by one or more distinct physical hosts or other server computer systems. For example, two nodes of the data replication group 212 may be executed by a first physical host and the remaining nodes, including the master node 202, of the data replication group 212 may be executed by a second physical host. The physical hosts may include a variety of computing resources such as the server computer systems described below in connection with FIG. 10.

The nodes 204 and master node 202 of the data replication group 212 may be connected through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 204 and master node 202 may be distributed across physical hosts and networks such that failure of one or more networks or physical hosts does not cause all of the nodes 204 of the data replication group 212 to fail.

Although six nodes and one master node 202 are illustrated in FIG. 2, any number of nodes 204 and master nodes 202 may be included in the data replication group 212 and distributed across a plurality of distributed computer systems in accordance with the present disclosure. However, in some embodiments, only a single master node is included in the data replication group 212. This restriction may be required by the consensus protocol implemented by the data replication group 212 or may be a restriction enforced in order to increase efficiency and/or optimize execution of the data replication group 212.

As illustrated in FIG. 2, the master node 202 may transmit a number of heartbeat requests 206. The heartbeat requests 206 may correspond to a heartbeat message or heartbeat process, for the purposes of the present disclosure, and may include various processes for renewing a lease of the master node role, checking the health, status, and validity of the nodes 204 of the data replication group 212, and progressing the consensus protocol implemented by the nodes 204 of the data replication group 212. The process of transmitting heartbeat requests 206 enables the master node 202 to maintain the current lease of the master node role if a quorum of nodes 204 provided responses to the heartbeat requests 206. In various embodiments, the heartbeat message 206 includes a lease identification number and a ballot number. The master node 202 may maintain the lease identification number of its current lease of the master node role and location information for the nodes 204 of the data replication group.

Alternatively, the master node 202 may obtain the lease identification number, the ballot number, and/or location information from the nodes 204 from another computer system or service such as the replication group service or management system thereof as described below in connection with FIG. 8. In various embodiments, the master node 202 generates the ballot number for each heartbeat request 206. The ballot number may be an increasing value such that each ballot number is unique for the current lease identification number. For example, if the master node 202 has a current lease identification number of 200, the first heartbeat message and set of corresponding heartbeat requests 206 thereof will have a ballot number of one, the second set of heartbeat requests 206 will have ballot number of two, the third set will have a ballot number of three and so on. As described above, the master node may generate multiple heartbeat requests 206 corresponding to multiple heartbeat messages during the lease renewal interval. The heartbeat requests may be transmitted over a network, a virtual network, or other suitable means of exchanging information between computer systems executing nodes 204 of the data replication group 212. For example, the physical host executing the master node 202 provides the master node access to a virtual network interface which is used to transmit data to a network interface of the physical host and then onto a destination such as the nodes 204 or a physical host executing the nodes 204.

Figure 3:
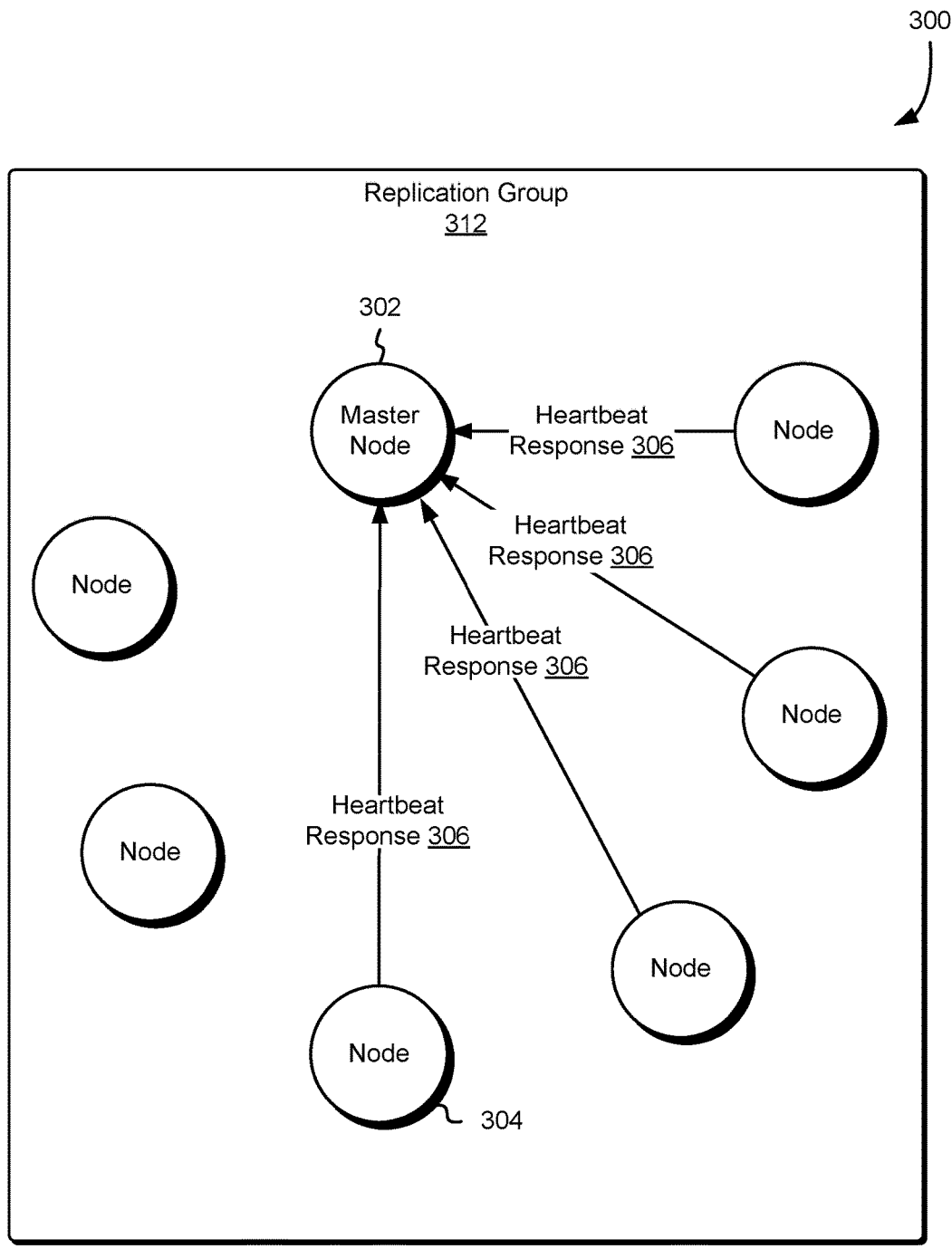
FIG. 3 illustrates an environment in which a set of nodes of a data replication group may be configured to execute an aspect of a lease protocol in accordance with at least one embodiment.

FIG. 3 illustrates an environment 300 in which a data replication group 312 may implement a consensus protocol between one or more nodes 304 and a master node 302, where the consensus protocol include a lease protocol for the role of master node in accordance with at least one embodiment. In various embodiments, only one node of the data replication group 312 is the master node 302 for any particular lease interval. Each node 304, including the master node 302, may be software or other executable code maintained in the memory of a physical host or other server computer system and executed by the physical host or other server computer system in order to provide the functionality described herein. Furthermore, the nodes 304 and master node 302 may be executed by one or more distinct physical hosts or other server computer systems. For example, two nodes of the data replication group 312 may be executed by a first physical host and the remaining nodes, including the master node 302, of the data replication group 312 may be executed by a second physical host. The physical hosts may include a variety of computing resources such as the server computer systems described below in connection with FIG. 10.

The nodes 304 and master node 302 of the data replication group 312 may be connected through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 304 and master node 302 may be distributed across physical hosts and networks such that failure of one or more networks or physical hosts does not cause all of the nodes 304 of the data replication group 312 to fail.

Although six nodes and one master node 302 are illustrated in FIG. 3, any number of nodes 304 and master nodes 302 may be included in the data replication group 312 and distributed across a plurality of distributed computer systems in accordance with the present disclosure. However, in some embodiments, only a single master node is included in the data replication group 312. This restriction may be required by the consensus protocol implemented by the data replication group 312 or may be a restriction enforced in order to increase efficiency and/or optimize execution of the data replication group 312. The master node 302 may be selected and/or determined from the set of nodes 304 in the data replication group 312 based at least in part on a node fitness score, random election, or other mechanisms for node election. For example, the data replication group 312 may be initialized with seven nodes 304 and the master node 302 may be selected from the set of seven nodes based at least in part on a particular election algorithm.

As illustrated in FIG. 3, the master node 302 may receive a number of heartbeat responses 306. The heartbeat responses 306 are generated by the nodes 304 in response to a heartbeat request as described above. The nodes 304 may maintain information associated with a previously received heartbeat request or other message from the master node 302. This enables the node 304 to determine if a particular message or heartbeat request received from the master node 302 or other source is a valid message. For example, after receiving a heartbeat request, a particular node may respond to the heartbeat request, if the lease identification number matches the last known lease identification number and the ballot number is higher than the last received heartbeat request. If the nodes 304 validate the heartbeat request (e.g., the lease identification number matches and the ballot number is higher) the nodes 304 may transmit a heartbeat response 306 to the master node 302.

The lease protocol may establish some number of heartbeat response 306 required for the master node 302 to renew its lease of the master node role. As illustrated in FIG. 3, four nodes of the data replication group provide the master node 302 with a heartbeat response 306. The nodes 304 of a data replication group 112 may be collected or assembled into groups, collectively referred to as quorums. In various embodiments, a quorum includes a majority of the nodes 304 of the data replication group 312. In various embodiments of the consensus protocol, any message sent to a node must be sent to the quorum of nodes, and any message received from a node is ignored unless a copy is received from each node in the quorum. However, implementation of the lease protocol may modify the behavior of the consensus protocol to reduce the number of messages exchanged between the nodes 304 as described above. For example, the master node 302 may transmit a heartbeat request to all or a quorum of the nodes 304 of the data replication group 312, but the nodes 304 may only transmit a heartbeat response 306 to the master node 302.

Figure 4:
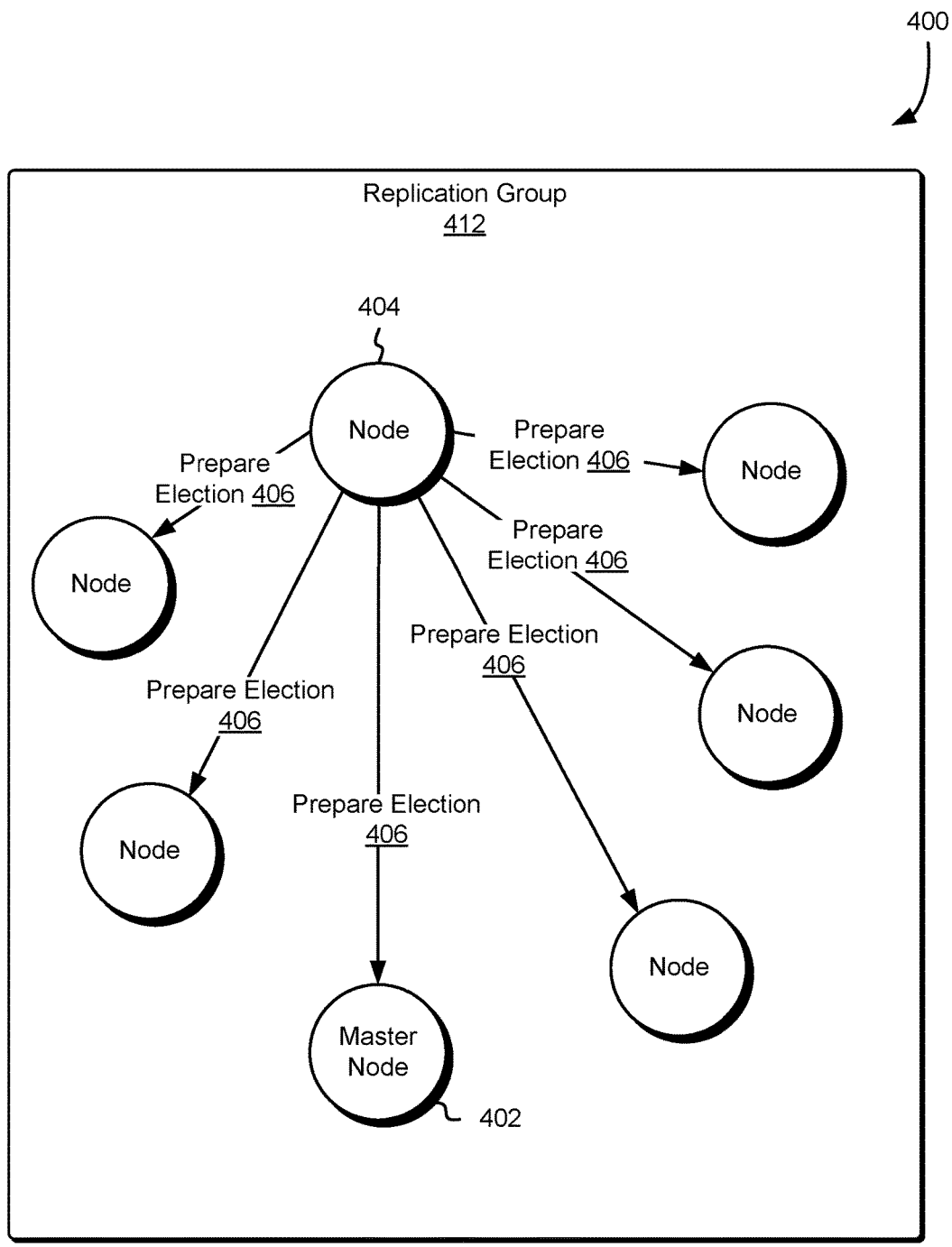
FIG. 4 illustrates an environment in which a set of nodes of a data replication group may be configured to execute an aspect of a lease protocol in accordance with at least one embodiment.

FIG. 4 illustrates an environment 400 in which a data replication group 412 may implement a consensus protocol between one or more nodes 404 and a master node 402, where the consensus protocols include a lease protocol for the role of master node in accordance with at least one embodiment. In various embodiments, only one node of the data replication group 412 is the master node 402 for any particular lease interval. Each node 404, including the master node 402, may be software or other executable code maintained in the memory of a physical host or other server computer system and executed by the physical host or other server computer system in order to provide the functionality described herein. Furthermore, the nodes 404 and master node 402 may be executed by one or more distinct physical hosts or other server computer systems. For example, two nodes of the data replication group 412 may be executed by a first physical host and the remaining nodes, including the master node 402, of the data replication group 412 may be executed by a second physical host. The physical hosts may include a variety of computing resources such as the server computer systems described below in connection with FIG. 10.

The nodes 404 and master node 402 of the data replication group 412 may be connected through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 404 and master node 402 may be distributed across physical hosts and networks such that failure of one or more networks or physical hosts does not cause all of the nodes 404 of the data replication group 412 to fail.

Although six nodes and one master node 402 are illustrated in FIG. 4, any number of nodes 404 and master nodes 402 may be included in the data replication group 412 and distributed across a plurality of distributed computer systems in accordance with the present disclosure. However, in some embodiments, only a single master node is included in the data replication group 412. This restriction may be required by the consensus protocol implemented by the data replication group 412 or may be a restriction enforced in order to increase efficiency and/or optimize execution of the data replication group 412. The master node 402 may be selected and/or determined from the set of nodes 404 in the data replication group 412 based at least in part on a node fitness score, random election, or other mechanisms for node election. For example, the data replication group 412 may be initialized with seven nodes 404 and the master node 402 may be selected from the set of seven nodes based at least in part on a particular election algorithm.

As illustrated in FIG. 4, a particular node of the data replication group may transmit a prepare election 406 request to a plurality of nodes 404 of the data replication group 412. As described above, the lease protocol may have various intervals during which certain action may be performed by the nodes 404 and/or master node 402. In the example illustrated in FIG. 4, the expiration of a safety interval has passed without the particular node receiving a heartbeat request or without receiving a valid heartbeat request. As a result, the particular node may determine to begin election/selection procedures. In various embodiments, nodes 404 of the data replication group 412 after expiration of the safety interval transmit message to the other nodes of the data replication group 412 to prepare for election/selection procedures. For example, as described in greater detail below in connection with FIG. 7, a particular node may transmit a message to one or more other nodes of the data replication group to determine if the nodes are in an expired lease state and, therefore, election/selection of a new master node can safely be commenced with a reduced risk of having two or more master nodes.

Returning to FIG. 4, the particular node may transmit prepare election 406 requests to all or a quorum of the nodes 404 of the data replication group. The prepare election 406 requests may include a new lease identification number and a new ballot number. If a certain number of responses are received in response to the prepare election 406 request, the particular node may be assigned the role of master node and may be considered the new master node. In various embodiments, the election requests 406 include information identifying the particular node as the new master node, lease configuration information including values for the various intervals (e.g., safety, wait, and lease renewal as described above), location information for the particular node, fitness information for the particular node, or any other information suitable for use in the election/selection of the new master node. In addition, the prepare election 406 request may be conditional and/or the nodes 404 may determine if various conditions are satisfied before returning an acceptance of the election request. For example, the nodes 404 may determine that the lease identification number included in the prepare election 406 request is the expected lease identification number to replace the current lease identification number. The checks and/or conditional nature of the election request prevents multiple nodes 404 from replacing the current master node 402 and from replacing a newly elected master node.

Figure 5:
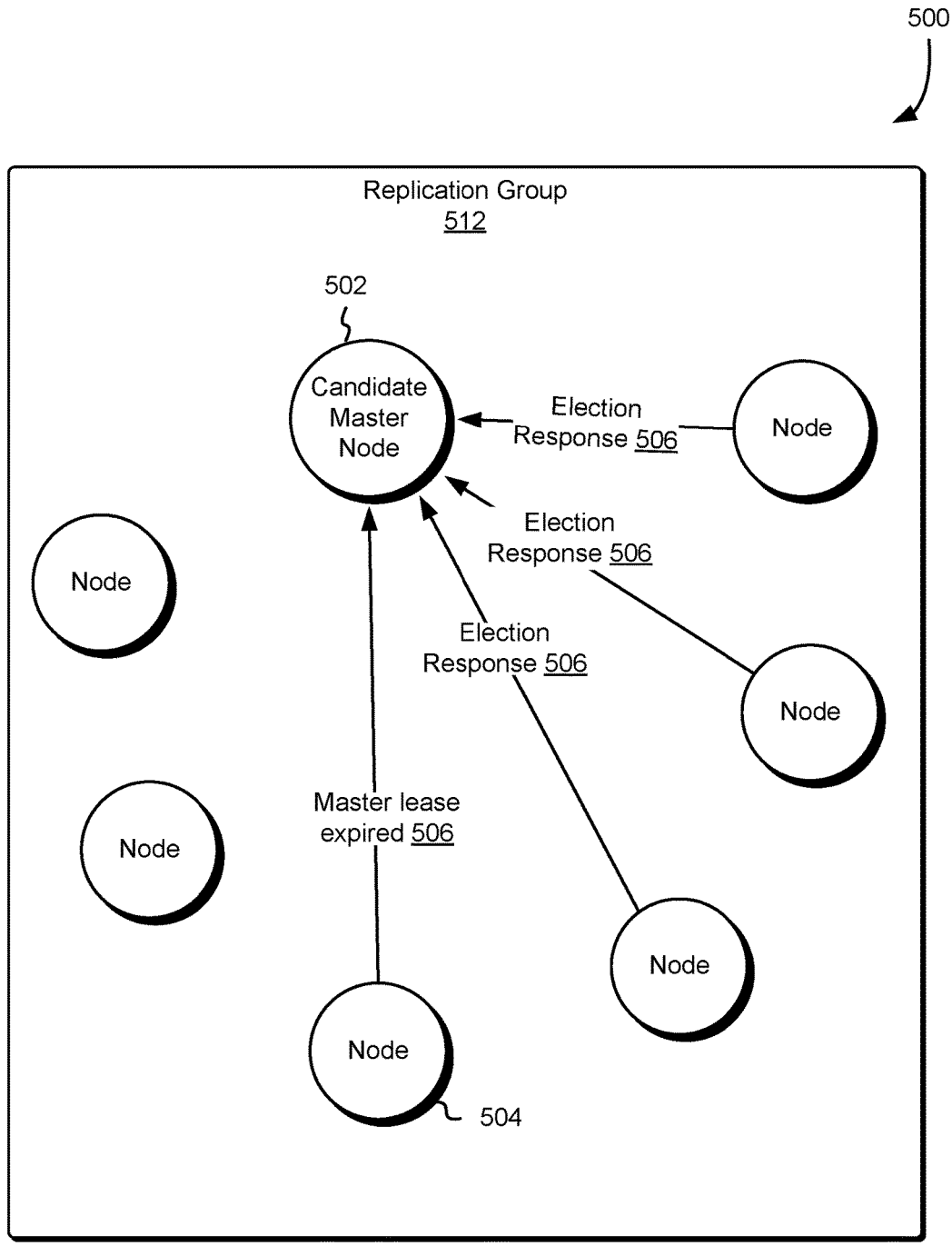
FIG. 5 illustrates an environment in which a set of nodes of a data replication group may be configured to execute an aspect of a lease protocol in accordance with at least one embodiment.

FIG. 5 illustrates an environment 500 in which a data replication group 512 may implement a consensus protocol between one or more nodes 504 and a candidate master node 502, where the consensus protocol includes a lease protocol for the role of master node in accordance with at least one embodiment. In various embodiments, only one node of the data replication group 512 is the candidate master node 502 for any particular lease interval. Each node 504, including the candidate master node 502, may be software or other executable code maintained in the memory of a physical host or other server computer system and executed by the physical host or other server computer system in order to provide the functionality described herein. Furthermore, the nodes 504 and candidate master node 502 may be executed by one or more distinct physical hosts or other server computer systems. For example, two nodes of the data replication group 512 may be executed by a first physical host and the remaining nodes, including the candidate master node 502, of the data replication group 512 may be executed by a second physical host. The physical hosts may include a variety of computing resources such as the server computer systems described below in connection with FIG. 10.

The nodes 504 and candidate master node 502 of the data replication group 512 may be connected through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 504 and candidate master node 502 may be distributed across physical hosts and networks such that failure of one or more networks or physical hosts does not cause all of the nodes 504 of the data replication group 512 to fail.

Although six nodes and one candidate master node 502 are illustrated in FIG. 5, any number of nodes 504 and candidate master nodes 502 may be included in the data replication group 512 and distributed across a plurality of distributed computer systems in accordance with the present disclosure. However, in some embodiments, only a single master node is included in the data replication group 512. This restriction may be required by the consensus protocol implemented by the data replication group 512 or may be a restriction enforced in order to increase efficiency and/or optimize execution of the data replication group 512. The candidate master node 502 may be selected and/or determined from the set of nodes 504 in the data replication group 512 based at least in part on a node fitness score, random election, or other mechanisms for node election. For example, the data replication group 512 may be initialized with seven nodes 504 and the candidate master node 502 may be selected from the set of seven nodes based at least in part on a particular election algorithm.

As illustrated in FIG. 5, the candidate master node 502 may be elected based at least in part on receiving a number of master lease expired responses 506. The number of master lease expired responses 506 to begin election/selection of the candidate master node 502 to the master node role may be determined by the consensus protocol and/or the lease protocol. For example, a quorum of the nodes 504 may be required to provide master lease expired responses 506 for election process, described in greater detail below in connection with FIG. 6, to begin and the new master node 504 to be assigned the master node role. As described above, the nodes upon determining the expiration of the current lease may after an interval of time (e.g., the safety interval) transmit a message to prepare for election/selection of the candidate master node 502. The message to prepare for election/selection may indicate a new lease identification number, the node responsible for transmitting the message, or other information suitable for electing/selection a new master node. Upon receipt of the message, the nodes 504 may transmit a response if the nodes 504 have determined the current lease has expired and the new lease identification number matches an expected lease identification number. The new lease identification number may match the expected lease identification number if a number of other nodes (e.g., a quorum) of the data replication group 512 have received the same lease identification number in the message to prepare for election/selection.

In various embodiments, if the nodes 504 have not determined the current lease has expired or the new lease identification number does not match the expected lease identification number, the nodes 504 will discard the message. If the nodes 504 determine the above conditions are satisfied, the nodes may transmit master lease expired response 506. The master lease expired response 506 may indicate that the nodes have determined that the current lease of the role of master node has expired. In addition, after transmitting master lease expired response 506, the nodes may cause the new lease identification number to be the current lease identification number and may reset the time interval associated with the lease protocol. As illustrated in FIG. 5, each node of the data replication group may determine various aspects of the lease protocol independently of one or more other nodes 504 of the data replication group. For example, as illustrated in FIG. 5, only four nodes of the data replication group 512 may respond to the prepare election request with an master lease expired response 506. There may be various reasons for this including network outage, a restart of the node or physical host implementing the node, an update to the node, a deployment to the node, network traffic or congestion, or any other reason for delaying or failing to receive a message.

Figure 6:
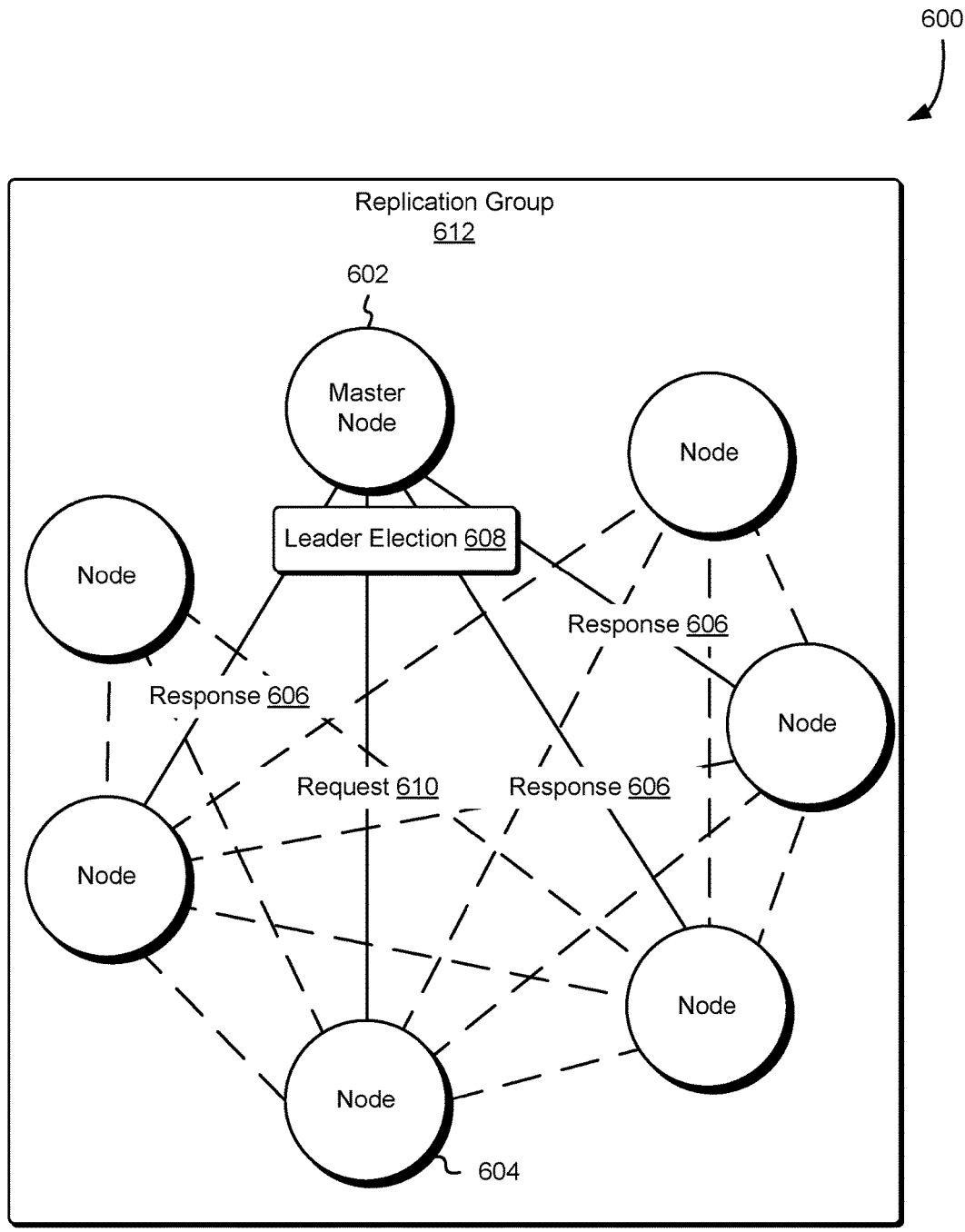
FIG. 6 illustrates an environment in which a set of nodes of a data replication group may be configured to elect a new master node in accordance with at least one embodiment.

FIG. 6 illustrates an environment 600 in which a data replication group 612 may implement a consensus protocol between one or more nodes 604 and elect a master node 602 based at least in part on the consensus protocol in accordance with at least one embodiment. In various embodiments, only one node of the data replication group 612 may be elected the master node 602 for any particular lease interval. Each node 604, including the master node 602, may be software or other executable code maintained in the memory of a physical host or other server computer system and executed by the physical host or other server computer system in order to provide the functionality described herein. Furthermore, the nodes 604 and master node 602 may be executed by one or more distinct physical hosts or other server computer systems. For example, two nodes of the data replication group 612 may be executed by a first physical host and the remaining nodes, including the master node 602, of the data replication group 612 may be executed by a second physical host. The physical hosts may include a variety of computing resources such as the server computer systems described below in connection with FIG. 10.

The nodes 604 and master node 602 of the data replication group 612 may be connected (illustrated as a solid line or dashed line between the nodes in FIG. 6) through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 604 and master node 602 may be distributed across physical hosts and networks such that failure of one or more networks or physical hosts does not cause all of the nodes 604 of the data replication group 612 to fail.

As illustrated by FIG. 6, during leader election 608, the data replication group may utilize the consensus protocol to ensure strong consistency when electing the master node 602. For example, during the leader election 608 the candidate master node may transmit election requests 610 to the nodes 604, the nodes 604 may then re-transmit the requests 610 to other nodes in accordance with the consensus protocol. The nodes 604 may transmit a response 606 to the election requests 610 to the candidate master node. If the candidate master node receives responses 606 from a quorum of node 604 the candidate master node may be elected master node 602 and may transmit a response indicating the candidate master node has been elected master node 602. Any number of election algorithms may be used in accordance with the present disclosure such that the election algorithm ensures consensus and strong consistency among the nodes. For example, Paxos leader election may be used to elect a single master node 602 for the data replication group 612.

Figure 7:
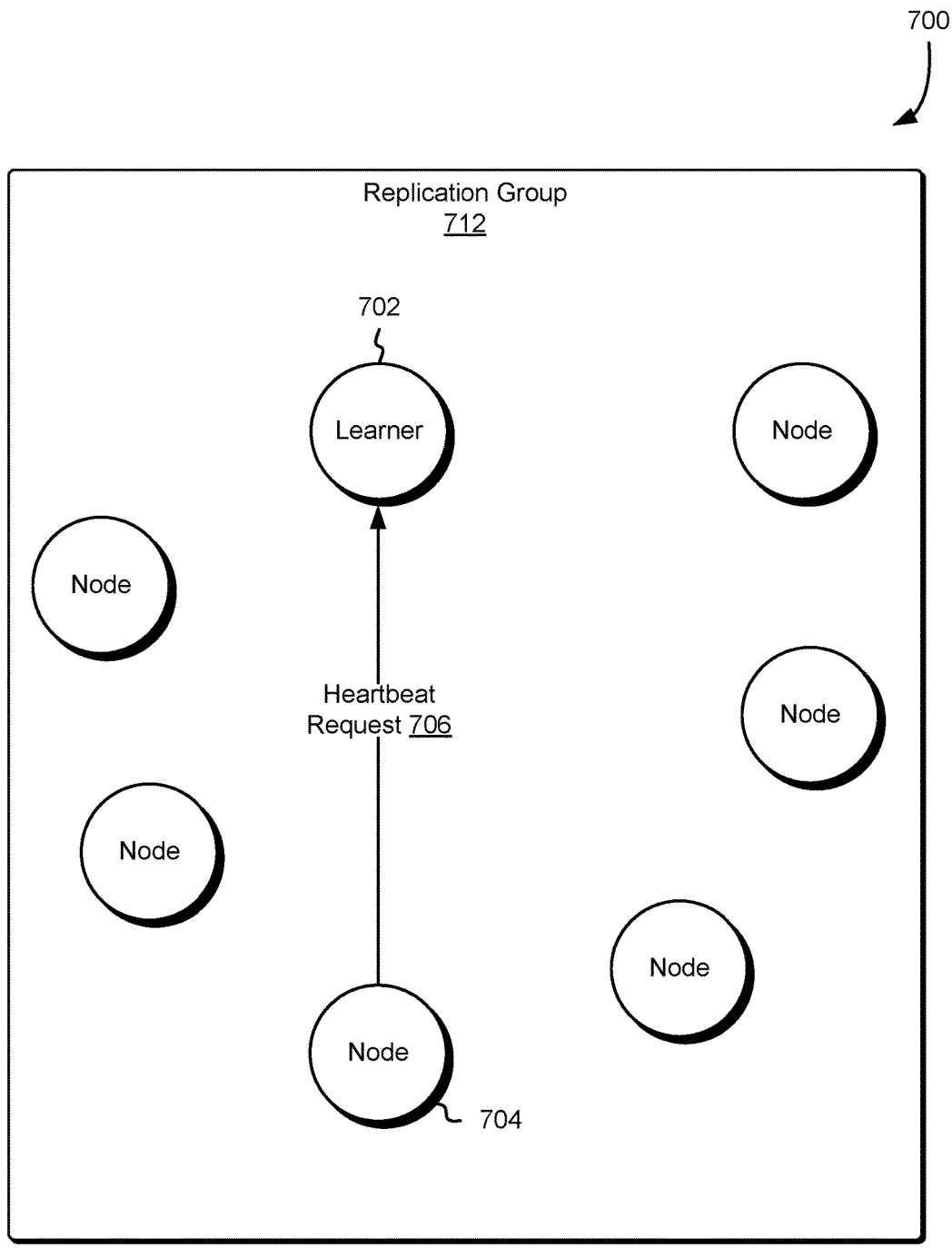
FIG. 7 illustrates an environment in which a set of nodes of a data replication group may be configured to execute an aspect of a lease protocol in accordance with at least one embodiment.

FIG. 7 illustrates an environment 700 in which a data replication group 712 may implement a consensus protocol between one or more nodes 704 and elect a master node 702 based at least in part on the consensus protocol in accordance with at least one embodiment. In various embodiments, only one node of the data replication group 712 may be elected the master node 702 for any particular lease interval. Each node 704, including the master node 702, may be software or other executable code maintained in the memory of a physical host or other server computer system and executed by the physical host or other server computer system in order to provide the functionality described herein. Furthermore, the nodes 704 and master node 702 may be executed by one or more distinct physical hosts or other server computer systems. For example, two nodes of the data replication group 712 may be executed by a first physical host and the remaining nodes, including the master node 702, of the data replication group 712 may be executed by a second physical host. The physical hosts may include a variety of computing resources such as the server computer systems described below in connection with FIG. 10.

As illustrated in FIG. 7, a particular node 704 may transmit a heartbeat request 706 to a learner 702. The learner may be any node of the data replication group that has incomplete state information. For example, the learner 702 may be a node returning from restart, as described in greater detail below in connection with FIG. 9. The heartbeat request 706 may correspond to a heartbeat message or heartbeat process, for the purposes of the present disclosure, and may include various processes for renewing a lease of the master node role, checking the health, status, and validity of the nodes of the data replication group 712, and progressing the consensus protocol implemented by the nodes of the data replication group 712. The process of transmitting heartbeat request 706 enables the master node to maintain the current lease of the master node role, if a quorum of nodes returns a response to various heartbeat requests. In various embodiments, the heartbeat message 706 includes a lease identification number and a ballot number. The master node 702 may maintain the lease identification number of its current lease of the master node role and location information for the nodes 704 of the data replication group.

In the example illustrated in FIG. 7, the learner 702 may not contain any information indicating the current lease identification number or the current ballot number. In addition, the learner 702 may initiate a catch-up algorithm as described below in connection with FIG. 12. The learner 702 may wait to receive a heartbeat request 706 from the master node as described above. If the learner 702 receives a heartbeat request 706 the learner 702 may accept the heartbeat request 706 and transmit a response to the heartbeat request 706 and set the current state a state indicating that the role of master node is currently leased. Alternatively, if the learner 702 does not receive a heartbeat request 706 within a wait interval, the learner may set the current state to a state indicating that the lease of the role of master node has expiring. If no heartbeat request 706 is received before the termination of a safety interval, the learner 702 may transmit requests to the other nodes to determine if the other nodes are in the same state (e.g., master node expired or expiring).

Figure 8:
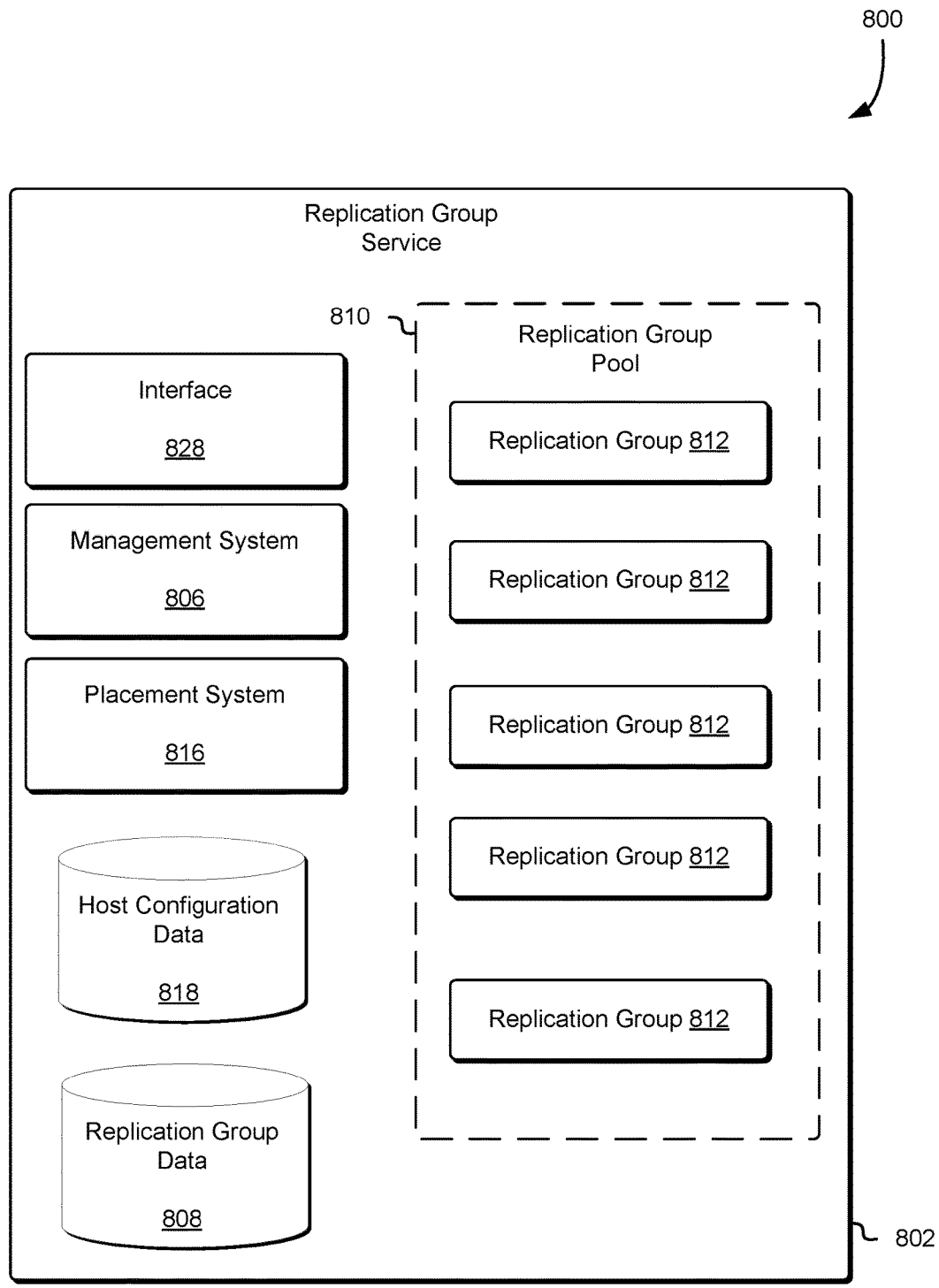
FIG. 8 illustrates an environment in which a replication group service may determine leadership information for nodes of a data replication group fleet in accordance with an embodiment.

FIG. 8 illustrates an environment 800 in which a computing resource service provider may operate a replication group service 802 configured to manage one or more data replication groups 812 in a pool 810 of data replication groups 812. Provisioning a data replication group 812 such that it may implement a consensus protocol and begin to receive traffic may increase latency or violate the terms of a service-level agreement (SLA). An SLA may be part of a service contract or other agreement between a computing resource service provider and a customer where a particular service is formally defined.

Particular aspects of the service (e.g., scope, quality, responsibilities, latency, and availability) may be agreed on between the computing resource service provider and the customer. The pool 810 of data replication groups 812 may enable the computer resource service provider to achieve a predefined level of performance as indicated in a particular SLA. The pool 810 of data replication groups 812 may enable replication group service 802 to asynchronously respond to a request for data replication groups 812 and provision new data replication groups 812. In addition, the data replication groups 812 may be optimized such that a particular node of the data replication group 812 is assigned the role of master node to achieve a predefined level of performance as indicated in a particular SLA.

In addition, there may be applications and/or services that require reduced latency when provisioning a particular data replication group 812 to receive traffic on behalf of the application or service. For example, a customer application may require the creation of a data replication group 812 for storage of customer data in a shorter time interval relative to an amount of time required to provision a data replication group 812. In order to achieve lower latency as may be required, a pool 810 of data replication groups 812 may be created such that fully functional data replication groups 812 are available when required without the need of provisioning a new data replication group 812. The nodes of the data replication groups 812 and the data replication group as a whole may be consider healthy and ready to receive traffic based at least in part on the success of various heartbeat messages as described above. Furthermore, the replication group service 802 may include an interface 828, management system 806, and a placement system 816. In addition, the replication group service 802 may maintain replication group data 808 and host configuration data 818.

Although all of the data replication groups 812 illustrated in FIG. 8 are members of the pool 810, other configurations of data replication groups 812 and pools 810 are within the scope of the present disclosure. For example, the replication group service 802 may maintain one or more data replication groups 812 outside of or aside from the pool 810 of data replication groups 812. In another example, the replication group service may maintain a plurality of pools 810. The pools 810 may be distributed across regions, geographic boundaries, physical boundaries, fault zones, power zones, or other logical groupings of computing resources in a distributed computing environment. As described above, a preference for a particular master node for each data replication group 812 in the pool 810 may be indicated by the placement system 816. In various embodiments, when determining a new master node the node of the data replication group may request information from the placement system 816, indicating one or more nodes of the data replication group's fitness and/or preference to be assigned the role of new master node.

The replication group service 802 may further include replication group data 808. Replication group data 808 may consist of data corresponding to the data replication groups 812, nodes of the data replication groups, customers or services mapped to the data replication groups 812, and any such other data as required by the management system 806 and/or replication group service 802. The replication group data 808 may be maintained in a database of other data stores such that the data is accessible and/or queryable by other components of the replication group service 802, customer, or other services. In one example, replication group data 808 may maintain data to aid in discovery of nodes by one or more other nodes of the data replication groups 812. This data may include a mapping of data replication groups 812 to nodes. Furthermore, the data may include information about particular nodes and/or roles of the particular nodes. For example, an input/output (I/O) request may be received at the interface 828 of the replication group service 802. The I/O request may indicate a particular data replication group 812, the replication group service 802 or component thereof, and may query the replication group data 808 in order to determine a leader or other node of the data replication group 812 designated to receive the I/O request.

In various embodiments, the placement system 816 may determine replication group data 808 such as aggregate fitness information for the data replication groups 812 based at least in part on leadership and/or fitness information for various nodes in the data replication groups 812. In addition, the aggregate fitness information for the data replication groups 812 is based at least in part on the information used to determine the leadership and/or fitness information for the various nodes in the data replication groups 812 and the success of various heartbeat messages exchanged between the various nodes of the data replication groups 812. The aggregate fitness information may be determined based at least in part on a function of the leadership and/or fitness information for various nodes in the data replication groups 812. For example, a weighted average may be used to determine the aggregate fitness information based at least in part on the leadership and/or fitness information and additional information associated with the nodes of the data replication group 812, such as the computing resources implementing the nodes or a location of the nodes. The aggregate fitness information for the data replication groups 812 may provide an indication of the overall health and/or performance of the pool 810 of data replication groups 812 or individual data replication groups 812. In addition, if the aggregate fitness information for the data replication groups 812 or a particular data replication group is below some threshold, the replication group service 802 may initiate procedures to improve the aggregate fitness information for the data replication groups 812. For example, the replication group service 802 may redistribute the nodes of the data replication group. In various embodiments, the aggregate fitness information and/or the leadership and/or fitness information is used to implement active placement of nodes of the data replication group 812 such that the replication group service 802 is continuously or at various points in time optimizing the placement of nodes of the data replication groups 812.

The data in the replication group data 808 may be updated at various intervals of time. For example, the management system 806 may query the nodes and/or data replication groups 812 in order to obtain information useable to update the replication group data 808. The replication group data 808 may also include information corresponding to the number of data replication groups 812 in the pool 810, a maximum number of data replication groups 812 to be included in the pool 810, and a frequency or number of requests for data replication groups 812 received by the replication group service 802. The replication group service 802 or component thereof may utilize this information to determine a rate at which data replication groups 812 are to be added to the pool 810. The process for adding data replication groups 812 to the pool 810 may include identifying a set of physical hosts suitable for hosting a new data replication group 812, initializing nodes on the set of physical hosts to be included in the new data replication group 812, initializing a consensus protocol among the nodes, providing leadership and/or fitness information to the nodes, validating the health of the data replication group 812 (e.g., determining the status of heartbeat messages), and updating the replication group data store to indicate that the new data replication group 812 is ready to receive traffic and is a member of the pool 810. A data replication group 812 may be considered healthy if a majority of the nodes of the data replication group 812 are operating as expected (e.g., have successfully validated the health of the node).

The replication group service 802 may further include host configuration data 818. The host configuration data 818 may consist of information indicating the location of various computing resources in a distributed computing environment, network topology, power topology, and any such other data as required by the placement system 816 and/or replication group service 802 to determine leadership and/or fitness information for various nodes of the data replication groups 812. The replication group data 808 may be maintained in a database of other data stores such that the data is accessible and/or queryable by other components of the replication group service 802, customer, or other services. In one example, the host configuration data 818 is maintained to enable the placement system 816 to determine suitable placement locations and determine leadership and/or fitness information for various nodes.

The data replication group 812 may be selected based at least in part on a variety of factors, such as the health of the data replication group 812, the time at which the data replication group 812 was created, a position of the data replication group 812 in a queue, attributes of the data replication group 812 (e.g., number of nodes, physical hosts implementing the nodes, location, latency, processing power, failure rate, fitness of a master node, etc.), a consensus protocol executed by the data replication group 812, and other factors that are suitable for selecting a particular data replication group 812 to fulfill a request. The selected data replication group 812 may then be associated with the new resource, customer, or other service responsible for submitting the request. At this point, the data replication group 812 may be ready to receive requests and store data.

An asynchronous process and/or thread may then be triggered by the replication group service 802 or component thereof such as the management system 806 in order to replace the data replication group 812 removed from the pools 810. This process and/or thread may be executed at a point in time of removal of the data replication groups 812 from the pool 810 or may be triggered based at least in part on other factors. For example, the process and/or thread to add new data replication groups 812 to the pool 810 may be executed based at least in part on the expiration of an interval of time. In another example, the process and/or thread to add new data replication groups 812 to the pool 810 may be executed based at least in part on a request rate for data replication groups 812 received by the replication group service 802 or component thereof, such as the interface 828. When adding a new data replication group 812 to the pool, the placement system 816 may determine leadership and/or fitness information for the new nodes of the new data replication group 812. This may incorporate leadership and/or fitness information from previous data replication groups. For example, the placement system 816 may track active master nodes (e.g., master nodes of a data replication group that are assigned to and used by a customer or computing resource) and generate leadership and/or fitness information to avoid placing a certain number of active master nodes on the same host computer system.

Figure 9:
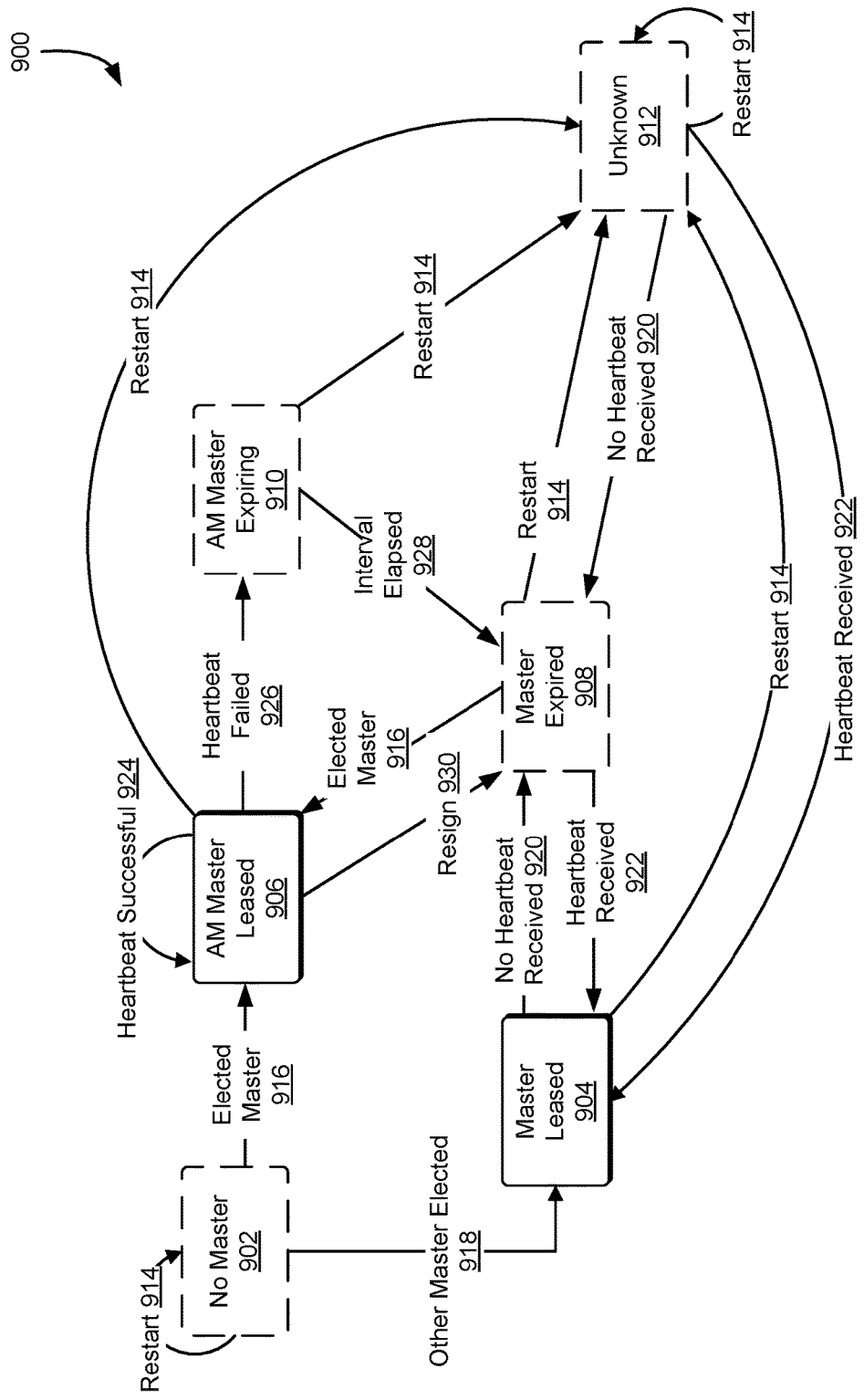
FIG. 9 shows a state diagram illustrating various aspects of a lease protocol implemented by a data replication group in accordance with an embodiment.

FIG. 9 illustrates a state diagram in which nodes and a master node of a data replication group implementing a lease protocol as described above may be in or transition between in accordance with an embodiment. The state diagram illustrated in FIG. 9 is used to describe the behavior of various nodes (e.g., nodes of various roles) of the data replication group. The behavior of the nodes, master nodes, and the data replication group as a whole is represented as a series of events that may occur in various states as illustrated in FIG. 9. The nodes, master node, and data replication group may be executed by physical hosts or other computing resources as described above. Furthermore, information and/or metadata associated with each state may be maintained by the nodes, master nodes, data replication group, or other computer systems such as the data replication group service or management system as described above. For example, the master node of the data replication group may maintain state information indicating that the master node is the current master node of the data replication group and the current lease identification number.

The state diagram illustrated in FIG. 9 contains several states and actions to transition between states. The states include "No Master" 902, "AM Master Leased" 906, "AM Master Expiring" 910, "Master Leased" 904, "Master Expiring" 908, and "Unknown" 912. In addition, AM Master Leased 906 and Master Leased 904 are terminal states while the remaining states are transitional states (terminal states are illustrated in FIG. 9 by solid lines and the transitional states are illustrated by dashed lines). A terminal state includes any state in which the nodes and master node may remain for an indeterminate amount of time. For example, as long as the current master node maintains the current lease (e.g., successfully completing a heartbeat message to a quorum of the nodes) the nodes and master node may remain in the Master Leased 904 and AM Master Leased 906. Transitional states may include any state in which the nodes and master node are required perform some action to transition out of. For example, the nodes in the Master Expiring 908 state must either receive a heartbeat message and transition to the Master Leased 904 state or receive response to an election request and transition to the AM master Leased 906 state as a result of being elected/selected to the master node role.

Returning to FIG. 9, the state diagram illustrated contains a No Master 902 state. Furthermore, the state diagram may represent all the possible states for any particular node of any particular data replication group. The No Master 902 state may represent a situation where a particular data replication group has been initialized with a certain number of nodes and the nodes begin implementing the consensus protocol and lease protocol. In these situations, the master node role may be assigned by another computer system such as the data replication group service or may be elected/selected as the master node. In yet other embodiments, the data replication group already contains a master node and is implementing a consensus protocol. In those embodiments, the nodes of the data replication group may begin in various different states. However, in the case where a particular node begins in the No Master 902 state, if the particular node is elected master 916, the particular node then transitions into AM Master Leased 906. The AM Master Leased 906 state indicates that the particular node has successfully leased the role of master node and may remain the master node so long has the lease is renewed during the lease renewal interval or the wait interval as described above. If the heartbeat is successful 924, the particular node will renew its lease and remain in the AM Master Leased 906 state.

If the particular node is not elected master, this means that another node was elected master and the particular node transitions along the other master elected 918 transition (illustrated in FIG. 9 as a directed line) to the Master Leased 904 state. This indicates that another node of the data replication group has been elected/selected as the master node. As discussed above, the other node may remain as the master node and the particular node may remain in the Master Leased 904 state so long as the lease is renewed during the lease renewal interval or the wait interval. However, if no heartbeat request is received 920 during or before the expiration of the wait interval, the particular node will transition to the Master Expiring 908 state. This Master Expiring 908 state indicates that no successful heartbeat message has been received either prior to expiration of the lease renewal interval or the wait interval. Furthermore, the Master Expiring 908 state may also indicate that no new heartbeat messages will be generated by the master node and that after the expiration of the safety interval, election/selection of a new master node may begin. However, if a successful heartbeat message is received 922 prior to the expiration of the safety interval, the particular node may transition back into the Master Leased 904 state because the master node has successfully renewed the current lease of the master node role.

Alternatively, if the lease is not renewed election/selection of a new master node will commence as described above. The election/selection may result in a node besides the particular node being elected master node and, as a result, a new heartbeat is received 922 from the particular node elected master node. However, if the particular node is elected/selected master 916 node, the particular node may transition to AM Master Leased 906. From the AM Master Leased 906 state, the particular node may resign 930 the role of master node. For example, the particular node may receive a new software deployment that requires a restart or may have failed a health check and require termination and, therefore, resign 930 the master node role to avoid delay and other issues caused when the master node becomes unresponsive. Furthermore, if the heartbeat messages failed 926 during the lease renewal interval, the particular node may transition to the AM Master Expiring 910 state. The AM Master Expiring 910 state may indicate that the current lease has expired and the particular node (e.g., the current master node) may no longer generate heartbeat requests or otherwise attempt to renew the lease. However, the lease may still be renewed during the wait interval in response to heartbeat request transmitted prior to the expiration of the lease renewal interval.

Similar to the No Master 902 state, there is an Unknown 912 state. Any time after a restart 914 the node may enter the Unknown state. This may be because the state information is maintained in memory and not persisted. From the Unknown 912 state, if a heartbeat is received 922 the particular node may transition into the Master Leased state 904. This may occur, for example, when a new node is added to the data replication group or an existing node of the data replication group returns from a restart 914. Alternatively, if no heartbeat is received 920, then the particular node may transition into the Master Expiring 908 state. This may be because all of the nodes or at least the particular node and the master node are returning from a restart 914.

Figure 10:
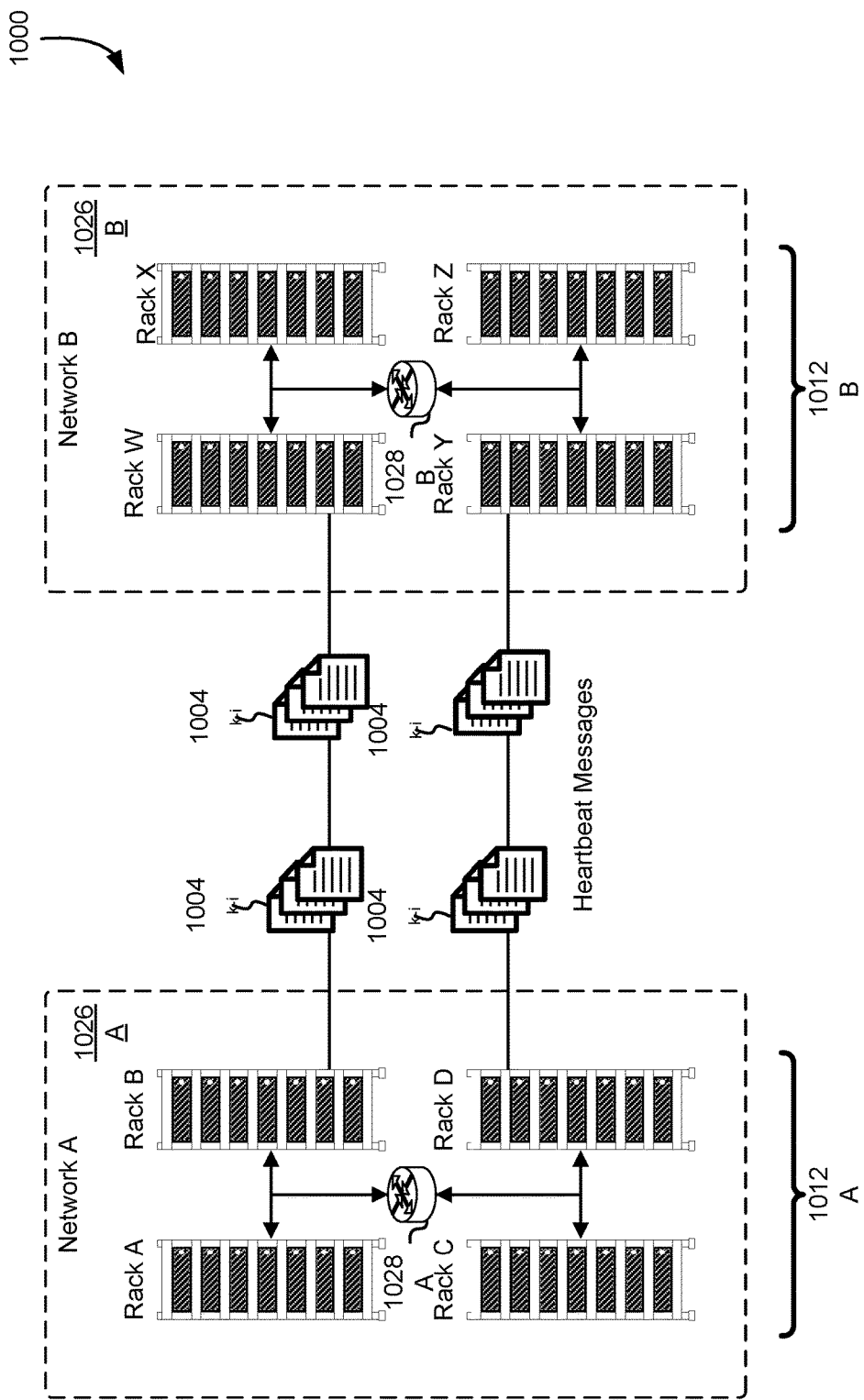
FIG. 10 illustrates an environment in which a data replication group may exchange heartbeat messages in accordance with an embodiment.

FIG. 10 illustrates an aspect of an environment 1000 in which an embodiment may be practiced. Specifically, FIG. 10 depicts the exchange of heartbeat messages 1004 between nodes of a data replication group implemented by one or more physical servers. The environment 1000 includes a set of servers or other components of the sets of racks 1012A-1012B used to provide computing resources to execute the various nodes and data replication groups as described above. The nodes may be placed on the servers according to a rack diversity constraint, hard constraints, soft constraints, and other constraints, where the sets of racks 1012 may be localized by different networks 1026A-1026B. The heartbeat messages $1004_{k-i}$ may include various messages described above such as a heartbeat request, heartbeat responses, election preparation requests, election requests, election responses, or any other message generated by the lease protocol or the consensus protocol implemented by the data replication groups as described above.

The nodes of the data replication groups may be software or executable code executed by the servers in the sets of racks 1012A-1012B or other computing resources that exchange heartbeat messages $1004_{k-i}$ generated by the servers in the sets of racks 1012A-1012B implementing nodes of the data replication groups as described above in conjunction with FIGS. 1-5. The sets of racks 1012A-1012B may be physical hardware that hosts one or more servers or, in some embodiments, is simply a logical grouping of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on). The servers in a rack may be members of a particular network. In some implementations, multiple racks of servers may be members of the same network. For example, as illustrated in FIG. 10, the servers of the set of racks 1012A share the network 1026A. Likewise, the servers of the set of racks 1012B share the network 1026B.

The networks 1026A-1026B may be data communication pathways between one or more electronic devices. The networks 1026A-1026B may be wired or wireless networks and may use any of a variety of communications protocols for organizing their network traffic. The networks 1026A-1026B may allow the sharing of files, data, and other types of information between the one or more electronic devices accessible through the data communication pathways. Each of the networks 1026A-1026B may be associated with a router, such as an aggregation router that aggregates the servers of the respective set of racks into the common network, separate from the router associated with the other network. Each of the networks 1026A-1026B may be on a different subnet than the other network. For example, as illustrated in FIG. 10, the servers of the set of racks 1012A may be commonly connected to a router 10210A. Similarly, the servers of the set of racks 1012B may be commonly connected to a router 10210B. The routers 1028A-1028B may be networking devices that forward packets between computer networks, such as between the networks 1026A-1026B.

Figure 11:
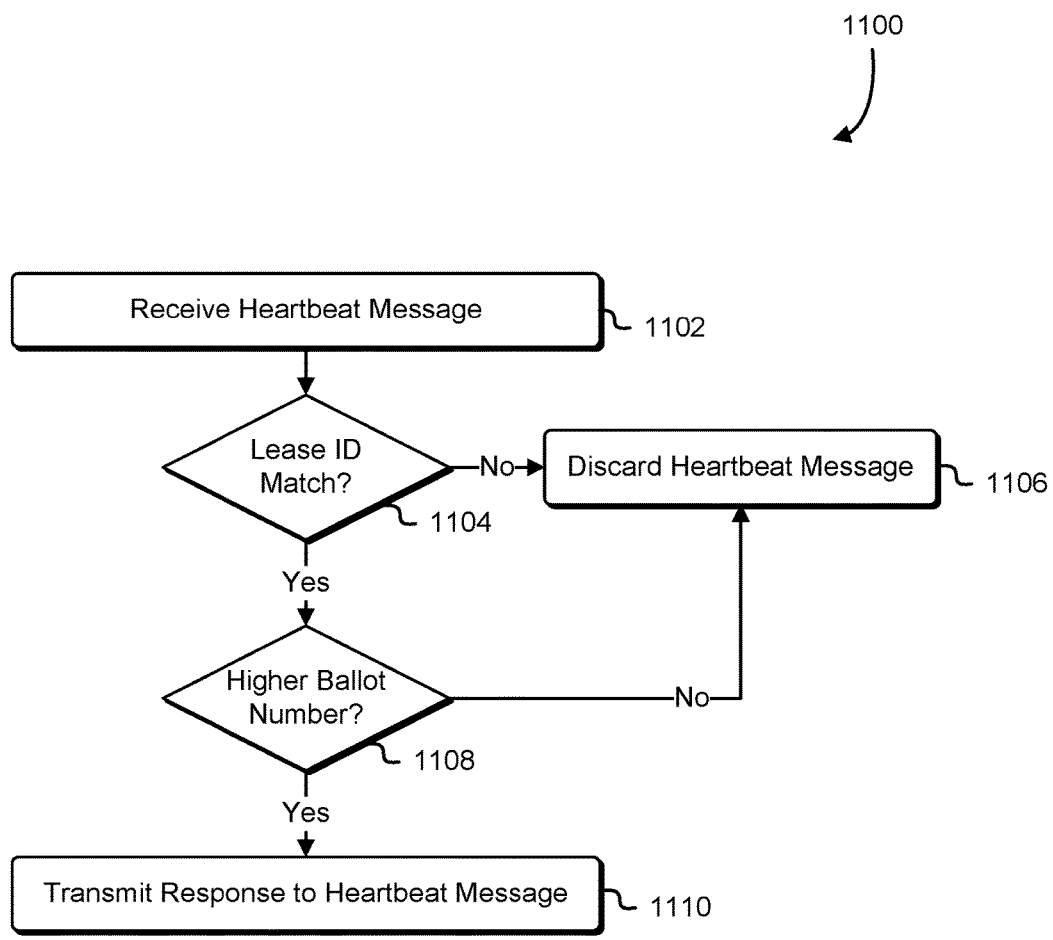
FIG. 11 shows an illustrative process which may be used to transmit a response to a heartbeat message in accordance with an embodiment.

FIG. 11 is a block diagram illustrating an example of a process 1100 for provisioning a data replication group consisting of one or more nodes in accordance with at least one embodiment. The process 1100 may be performed by any suitable system such as nodes of a data replication group as described above in connection with FIGS. 1-5. The process 1100 includes receiving a heartbeat message 1102. As described above, the heartbeat message may include any number of messages exchanged between nodes of the data replication group such as a heartbeat request, heartbeat response, election preparation request, election request, election response, or other message exchanged as part of a consensus protocol executed by the node the of the data replication group. After receiving the heartbeat message, the node then determines if the lease identification number included in the heartbeat message matches the expected/current lease identification number 1104.

As described above, each lease of the master node role may be assigned a unique (relative to the data replication group) lease identification number that is used to track the current master node role lease. If the lease identification number does not match, the heartbeat message is discarded 1106 and the node resumes normal operation. The lease identification number may reduce the risk of multiple nodes acting as the master node. However, if the lease identification number does match, the node may check the ballot number included in the heartbeat message. If the ballot number is lower than the previous/expected ballot number, the heartbeat message is discarded 1106 and the node resumes normal operation. As described above, the ballot number may be a continuously increasing number used to differentiate and identify heartbeat messages. The ballot number may be lower in a situation where the heartbeat message was delayed in transit. However, if the ballot number is higher 1108, the node then transmits a response to the heartbeat message 1110. The response may indicate successful receipt of the heartbeat message. As described above, the lease protocol enables the master node to maintain the master node role and renew the lease thereof if a quorum of the nodes of the data replication group transmits a response to any particular heartbeat request. Furthermore, the lease protocol enables renewal of the master node role lease without the strict consistency requirement of the consensus protocol.

Figure 12:
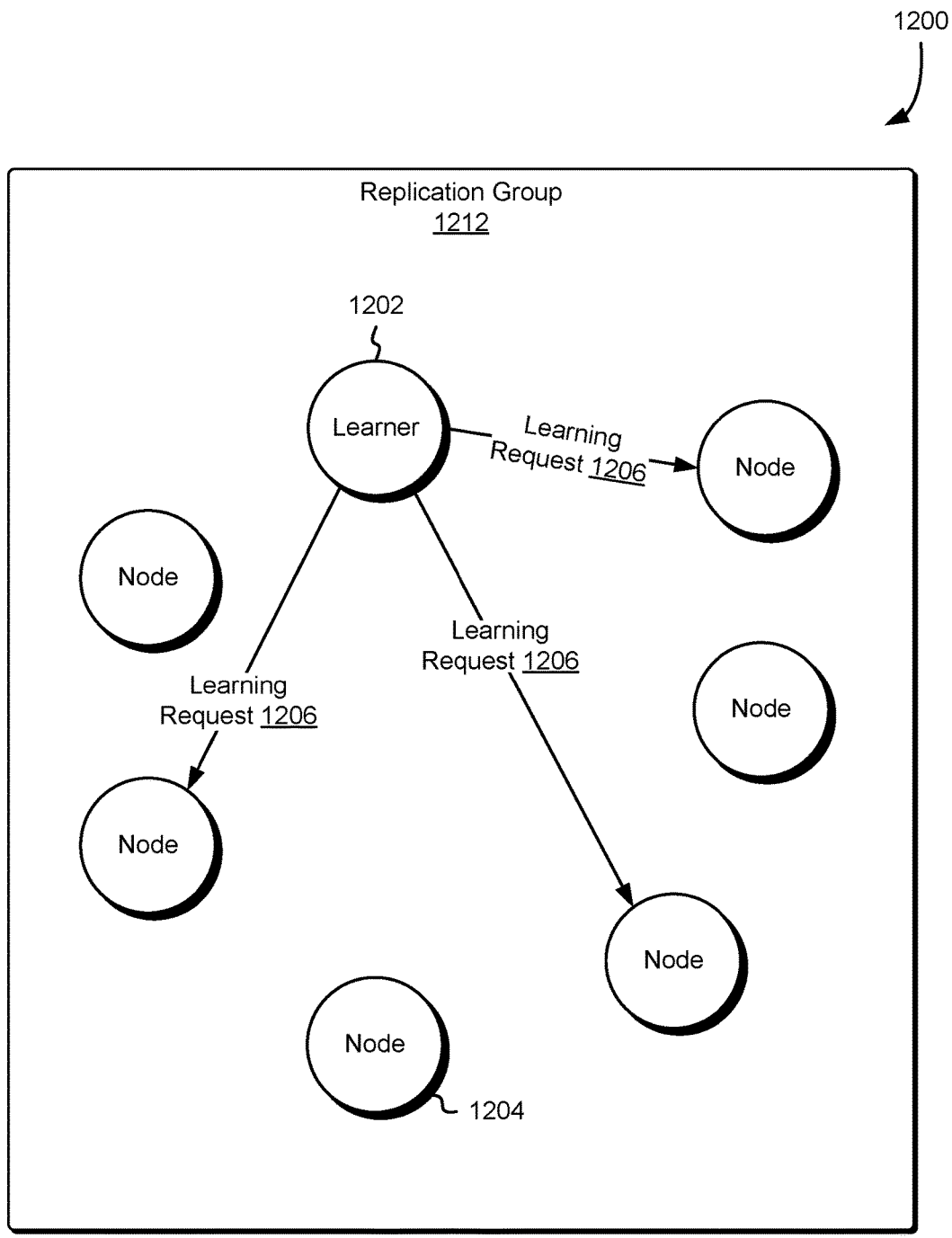
FIG. 12 illustrates an environment in which a set of nodes of a data replication group may be configured to execute a catchup algorithm in accordance with at least one embodiment.

FIG. 12 illustrates an environment 1200 in which a data replication group 1212 may implement a catchup algorithm of a consensus protocol between one or more nodes 1204 of a data replication group 1212 in accordance with at least one embodiment. For example, after returning from a restart as described above in connection with FIG. 9. In addition, at least one node 1204 of the data replication group 1212 may be a learner 1202. The learner 1202 may be a node of the data replication group 1212 that has determined that the state of the node is stale or otherwise behind the state of other nodes 1204 of the group, and execution of a catchup algorithm is required to match the current state of the data replication group 1212. Each node 1204, including the learner 1202, may be software or other executable code maintained in the memory of a physical host or other server computer system and executed by the physical host or other server computer system in order to provide the functionality described herein. Furthermore, the nodes 1204 and learner 1202 may be executed by one or more distinct physical hosts or other server computer systems. For example, two nodes 1204 of the data replication group 1212 may be executed by a first physical host and the remaining nodes 1204, including the learner 1202, of the data replication group 1212 and may be executed by a second physical host. The physical hosts are described in greater detail below.

The nodes 1204 and learner 1202 of the data replication group 1212 may be connected through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 1204 and learner 1202 may be distributed across physical hosts and networks such that failure of one or more networks or physical hosts does not cause all of the nodes 1204 of the data replication group 1212 to fail. Although six nodes 1204 and one learner 1202 are illustrated in FIG. 12, any number of nodes 1204 and learners 1202 may be included in the data replication group 1212 and distributed across a plurality of distributed computer systems in accordance with the present disclosure. For example, five nodes 1204 of the data replication group illustrated in FIG. 12 may be a learner executing a catchup algorithm. In addition, the data replication group may include a master node as described above (not shown in FIG. 12 for simplicity).

The data replication group 1212 may further include software or other executable code configured to manage the operation of the data replication group 1212, nodes 1204, and/or learner 1202. Managing the operation of the data replication group 1212 may include creating new nodes 1204, replacing failed nodes 1204, providing discovery of nodes, backing up data maintained by the nodes 1204, determining roles of the consensus protocol to be performed by the nodes 1204, executing a catchup algorithm, and such other operations as required to ensure the functioning of the data replication group 1212. The data replication group 1212, illustrated in FIG. 12, may be used in connection with various embodiments described herein. For example, the data replication group 1212 may be a member of a pool of data replication groups described above in connection with FIG. 8. In various embodiments, the learner 1202 may determine staleness based at least in part on receipt of a heartbeat operation from the master node or other node of the data replication group. For example, the data replication group may be configured such that the master node transmits a heartbeat message every two milliseconds to ensure communication between the nodes and renew the lease of the master node role. Therefore, if a node does not receive a heartbeat message at the expiration of an interval of time, the node may execute a catchup algorithm to determine if the node is stale.

The learner, as illustrated in FIG. 12, may execute an unsupervised catchup algorithm. For each learner 1202 of the data replication group 1212, the learner may initialize a set of nodes 1204 to learn from. The set of nodes 1204 to learn from may include the original members of the data replication group 1212 or may include an updated membership of the data replication group based at least in part on information included in the log. If the learner is a new node and does not have membership information, the learner may determine the membership information and include the membership information in the set of nodes 1204 to learn from. The learner 1202 may then randomly or pseudo randomly select a particular node from the set of nodes 1204 to learn from. The learner may then transmit a learning request 1206 to the selected node.

The learner 1202 may then receive, in response to the learning request 1206 from the selected node, a log or other information from the node that may enable the learner 1202 to copy and/or replicate the state of the selected node. In various embodiments, the logs of the nodes 1204 may have been trimmed or otherwise deleted in order to reduce the amount of computing resources used by the nodes 1204; in such cases, the learner 1202 may simply copy the state of the node (e.g., obtain a snapshot of the node and copy the snapshot over to the memory of the learner 1202). After copying the state of the selected node the learner 1202 may continue the catchup algorithm. For example, the learner 1202 may select another node from the set of nodes 1204 to learn from. In various embodiments, the unsupervised catchup algorithm may include a round-robin element. Specifically, the learner 1202 may remove the selected node from the set of nodes 1204 which may be learned from. The learner 1202 may continue to transmit learning requests and check for staleness until the learner 1202 has determined that the state of the learner 1202 matches the state of the data replication group 1212. Other catchup and/or learning algorithms may be used in accordance with the present disclosure, such as a random learner, designated learner, hierarchical learner, circular learner, full learner, or other suitable learning algorithm.

Figure 13:
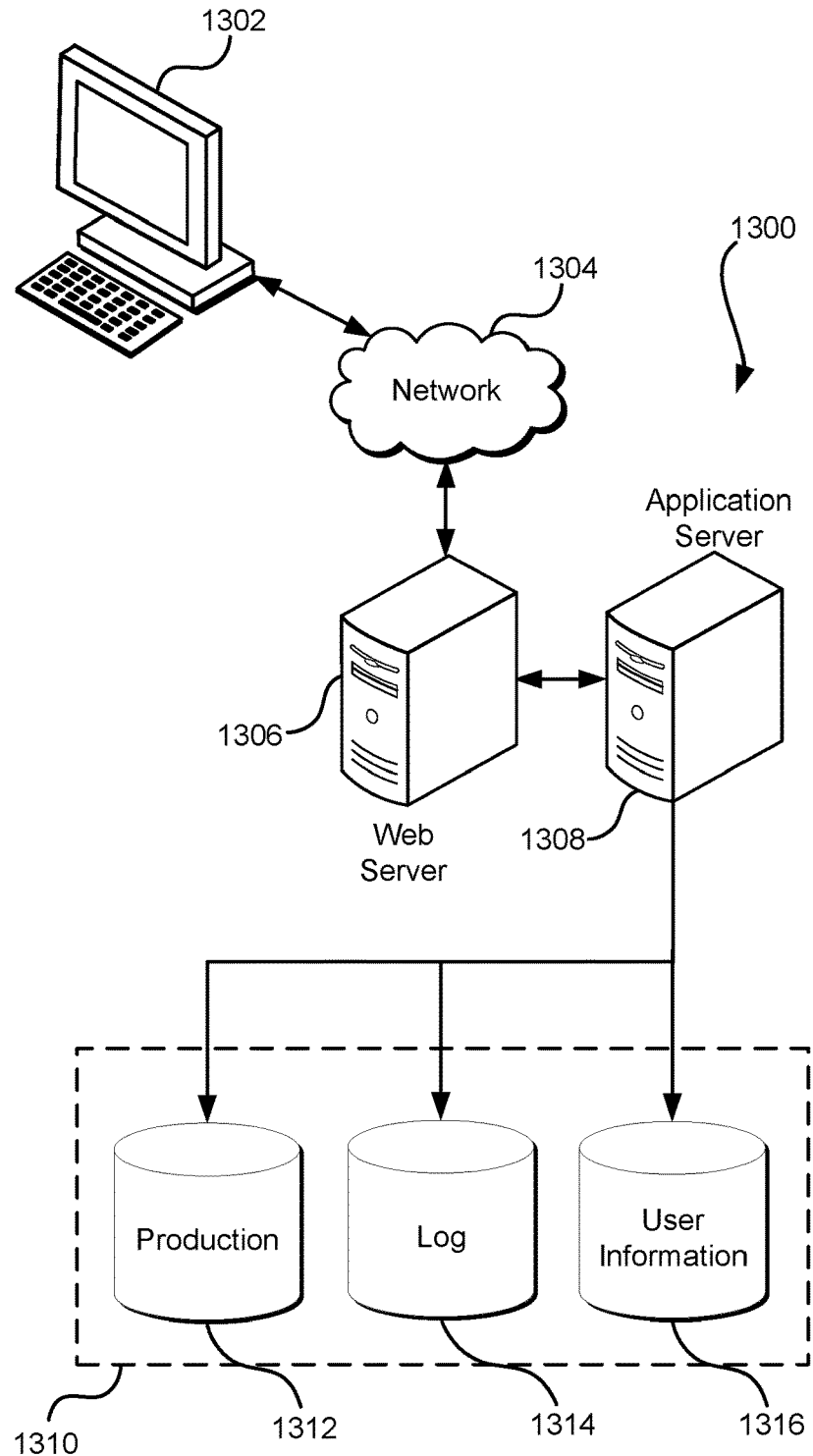
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages, or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1302 and the application server 1308, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   determining a particular node of a plurality of nodes of a data replication group has been elected as a master node and setting a current state to a leased state, the plurality of nodes implementing a consensus protocol for replicating data across the plurality of nodes;
   transmitting, by the master node, heartbeat messages to individual nodes of the plurality of nodes;
   on a condition that responses to the heartbeat messages are not received by the master node from a quorum of the plurality of nodes within a heartbeat interval, suspending transmission of further heartbeat messages;
   on a condition that responses to the heartbeat messages are not received by the master node from a quorum of the plurality of nodes within a wait period, the wait interval being a period during which the master node waits to receive responses to pending heartbeat messages, the wait interval being greater than the heartbeat interval, setting the current state to an expiring state; and
   after expiration of a safety interval, the safety interval being greater than the wait interval, commencing election of a new master node.

2. The computer-implemented method of claim 1, wherein the master node no longer transmits heartbeat messages after the expiration of the heartbeat interval during a wait interval, where the wait interval indicates an interval of time before election of the new master node may commence during which the particular node may renew the leased state.

3. The computer-implemented method of claim 2, wherein the computer-implemented method further comprises:
   receiving a response to a heartbeat message transmitted to the particular node of the set of nodes; and
   resetting the current state to the leased state.

4. The computer-implemented method of claim 1, wherein transmitting the heartbeat messages further comprises ensuring the heartbeat messages are transmitted by only one node of the set of nodes of the data replication group.

5. A system, comprising:
   one or more processors; and
   memory that includes instructions that, as a result of being executed by the one or more processors, cause the system to:
     during a first interval, transmit a set of heartbeat messages to individual nodes of a plurality of nodes of a data replication group, the plurality of nodes implementing a consensus protocol, where a current state corresponds to a role of master node being leased; and
     in response to a failure to receive a set of responses to the set of heartbeat messages from a quorum of the plurality of nodes during a second interval:
       modify the current state such that the current state indicates that the role of master node is expiring and no longer transmits heartbeat messages;
       transmit, after a third interval, a set of election requests to the plurality of nodes.

6. The system of claim 5, wherein the instructions that cause the system to transmit the set of messages further include instructions that, as a result of being executed by the one or more processors, cause the system to transmit the set of messages based at least in part on a particular node of the plurality of nodes assigned the role of master node transmitting a message indicating the particular node has resigned the role of master node.

7. The system of claim 5, wherein each heartbeat message of the set of heartbeat messages includes at least a lease identification number and a ballot number, the lease identification number indicates a particular lease of the role of master node and the ballot number indicates a particular message.

8. The system of claim 5, wherein the instructions that cause the system to transmit the set of election requests further include instructions that, as a result of being executed by the one or more processors, cause the system to transmit the set of election requests in accordance with an election algorithm.

9. The system of claim 5, wherein the memory further includes instructions that, as a result of being executed by the one or more processors, cause the system to:
   receive a response to a particular heartbeat message of the set of heartbeat messages during the second interval;
   receive the set of responses from the quorum of nodes of the plurality of nodes; and
   renew the lease of the role of master node.

10. The system of claim 5, wherein the memory further includes instructions that, as a result of being executed by the one or more processors, cause the system to transmit an election request to the plurality of nodes based at least in part on the expiration of a third interval.

11. The system of claim 10, wherein transmitting the election request further includes transmitting the election request as a result of the number of responses to the set of messages indicates that the quorum of nodes of the plurality of nodes share the current state indicating that the role of master node is expiring.

12. The system of claim 11, wherein the first interval is less than the second interval and the second interval is less than the third interval.

13. A set of one or more non-transitory computer-readable storage media having stored thereon executable instructions that, as a result of being executed by one or more processors of a computer system, cause the computer system to:
- transmit a set of messages to a plurality of nodes of a data replication group, the plurality of nodes implementing a consensus protocol including at least one node having a role of master node of the data replication group, wherein receipt of a response from a quorum of the plurality of nodes during a first interval results in a renewal of a lease;
- after not receiving a set of responses to the set of messages from a quorum of the plurality of nodes within a second interval, indicate that the lease of the role of master node is expiring; and
- at the expiration of a third interval, select a node of the plurality of nodes to obtain the role of master node.

14. The set of one or more non-transitory computer-readable storage media of claim 13, wherein the consensus protocol further comprises a Paxos consensus protocol.

15. The set of one or more non-transitory computer-readable storage media of claim 13, wherein the instructions that cause the computer system to transmit the set of messages further include instructions that cause the computer system to transmit the set of messages not in accordance with the consensus protocol.

16. The set of one or more non-transitory computer-readable storage media of claim 13, wherein the instructions that cause the computer system to transmit the set of messages further include instructions that cause the computer system to include a lease identification number in the set of messages.

17. The set of one or more non-transitory computer-readable storage media of claim 13, wherein the instructions further comprise instructions that, as a result of being executed by the one or more processors, cause the computer system to generate a new lease identification number associated with the node of the plurality of nodes selected to obtain the role of master node.

18. The set of one or more non-transitory computer-readable storage media of claim 13, wherein the instructions that cause the computer system to select the node of the plurality of nodes to obtain the role of master node further include instructions that cause the computer system to select the node of the plurality of nodes based at least in part on a master node election algorithm.

19. The set of one or more non-transitory computer-readable storage media of claim 13, wherein the instructions that cause the computer system to select the node of the plurality of nodes to obtain the role of master node further include instructions that cause the computer system to select the node based at least in part on a quorum of the nodes indicating that the role of master node is expiring.

20. The set of one or more non-transitory computer-readable storage media of claim 13, wherein the instructions further comprise instructions that, as a result of being executed by the one or more processors, cause the computer system to receive a response to a particular message of the set of message messages during the second interval and causing the role of the master node to be renewed.

* * * * *